(12) United States Patent
Umess et al.

(10) Patent No.: US 11,899,234 B2
(45) Date of Patent: Feb. 13, 2024

(54) INPUT COUPLING

(71) Applicant: AKONIA HOLOGRAPHICS LLC, Longmont, CO (US)

(72) Inventors: Adam Umess, Louisville, CO (US); Kenneth E. Anderson, Longmont, CO (US); Friso Schlottau, Lyons, CO (US); Mark R. Ayres, Boulder, CO (US)

(73) Assignee: Akonia Holographics LLC, Longmont, CO (US)

( * ) Notice: Subject to any disclaimer, the term of this patent is extended or adjusted under 35 U.S.C. 154(b) by 449 days.

(21) Appl. No.: 16/688,878

(22) Filed: Nov. 19, 2019

(65) Prior Publication Data

US 2020/0088931 A1 Mar. 19, 2020

Related U.S. Application Data

(63) Continuation of application No. 15/826,661, filed on Nov. 29, 2017, now Pat. No. 10,509,153.

(60) Provisional application No. 62/505,002, filed on May 11, 2017, provisional application No. 62/427,727, filed on Nov. 29, 2016.

(51) Int. Cl.
| | |
|---|---|
| *G02B 5/32* | (2006.01) |
| *F21V 8/00* | (2006.01) |
| *G02B 27/01* | (2006.01) |
| *G02B 5/18* | (2006.01) |
| *G02B 6/34* | (2006.01) |

(52) U.S. Cl.
CPC ............. *G02B 6/0028* (2013.01); *G02B 5/18* (2013.01); *G02B 6/0035* (2013.01); *G02B 6/34* (2013.01); *G02B 27/0172* (2013.01); *G02B 5/32* (2013.01); *G02B 2027/0123* (2013.01); *G02B 2027/0125* (2013.01); *G02B 2027/0174* (2013.01); *G02B 2027/0178* (2013.01)

(58) Field of Classification Search
CPC ...... G02B 6/0028; G02B 5/18; G02B 6/0035; G02B 6/34; G02B 27/0172; G02B 5/32; G02B 2027/0123; G02B 2027/0125; G02B 2027/0174; G02B 27/4272
See application file for complete search history.

(56) References Cited

U.S. PATENT DOCUMENTS

| | | |
|---|---|---|
| 5,949,557 A | 9/1999 | Powell |
| 7,162,136 B1 | 1/2007 | Pertl et al. |
| 7,245,408 B1 | 7/2007 | Huang et al. |
| 7,418,170 B2 | 8/2008 | Mukawa et al. |

(Continued)

*Primary Examiner* — Balram T Parbadia
(74) *Attorney, Agent, or Firm* — Michael H. Lyons

(57) ABSTRACT

An optical device including a first layer of a total internal reflection (TIR) waveguide and a second layer of the TIR waveguide is disclosed. The second layer of the TIR waveguide may be coupled to the first layer. The second layer may include an output coupling device configured to reflect light toward an exit face of the TIR waveguide. The output coupling device may include one or more diffractive gratings. The optical device may also include an input coupling face disposed on a non-diffractive edge portion the first layer or the second layer or both the first and second layer. The input coupling face may be configured to receive image light. Another optical device may include an input coupling face disposed on a non-diffractive input coupling element. The non-diffractive input coupling element may be positioned in an optical path for directing the image light to the TIR waveguide.

20 Claims, 19 Drawing Sheets

(56) References Cited

U.S. PATENT DOCUMENTS

| | | | |
|---|---|---|---|
| 7,502,168 | B2 | 3/2009 | Akutsu et al. |
| 8,665,178 | B1 | 3/2014 | Wang |
| 8,760,762 | B1 | 6/2014 | Kelly et al. |
| 9,207,461 | B2 | 12/2015 | Frankel et al. |
| 9,349,165 | B2 | 5/2016 | Cho et al. |
| 9,651,368 | B2 | 5/2017 | Abovitz et al. |
| 9,671,566 | B2 | 6/2017 | Abovitz et al. |
| 9,823,423 | B2 | 11/2017 | Waldern et al. |
| 9,959,818 | B2 | 5/2018 | Bohn |
| 10,042,109 | B2 | 8/2018 | Hikmet et al. |
| 2009/0309811 | A1 | 12/2009 | Hinton |
| 2011/0026128 | A1 | 2/2011 | Baker et al. |
| 2013/0222919 | A1 | 8/2013 | Komatsu et al. |
| 2013/0242555 | A1 | 9/2013 | Mukawa |
| 2015/0077312 | A1 | 3/2015 | Wang |
| 2015/0205126 | A1 | 7/2015 | Schowengerdt |
| 2015/0309264 | A1 | 10/2015 | Abovitz et al. |
| 2016/0109713 | A1 | 4/2016 | Osterhout |

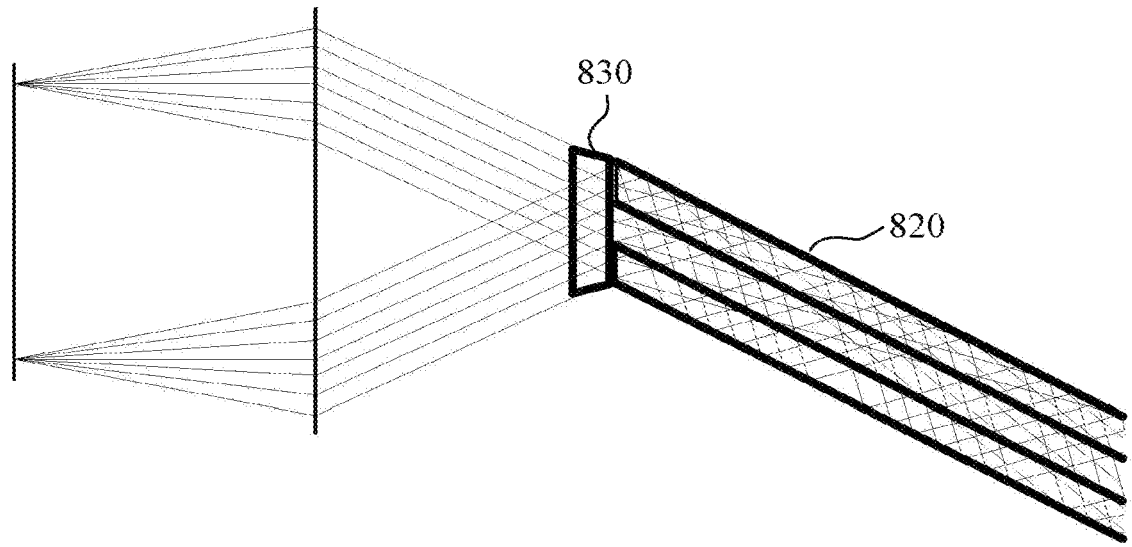
FIG. 8 ← 800
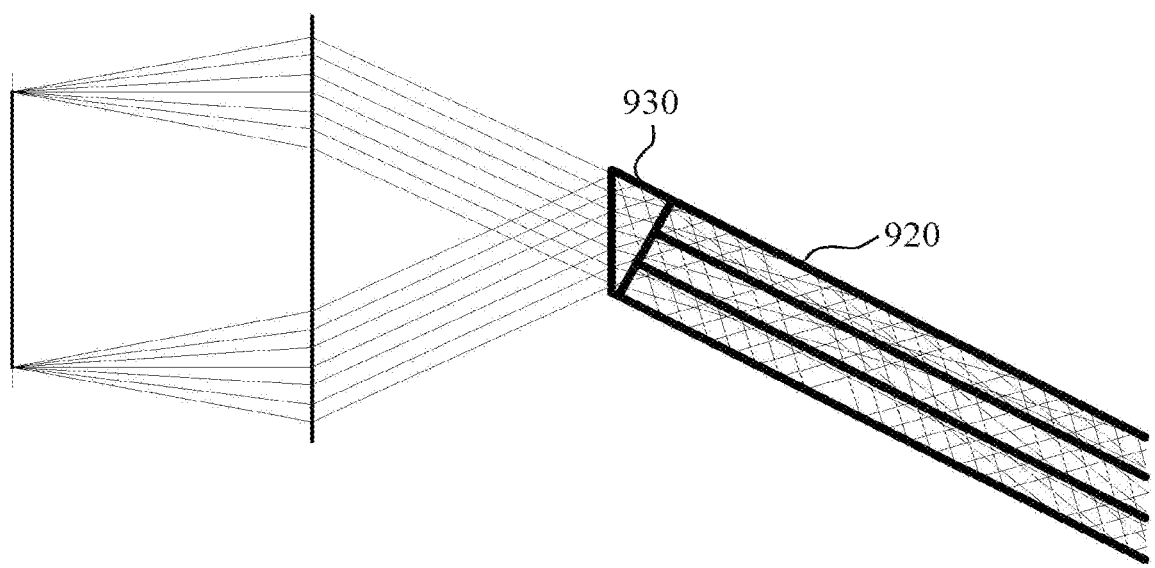
FIG. 9 ← 900

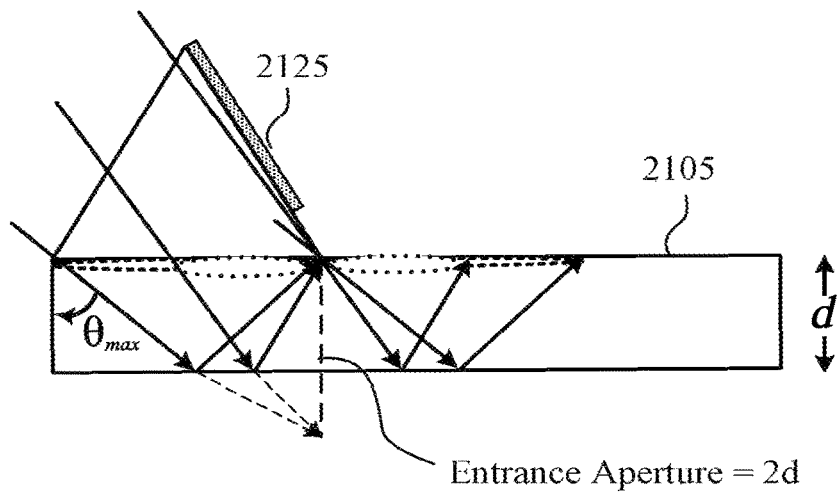
FIG. 21 — 2100
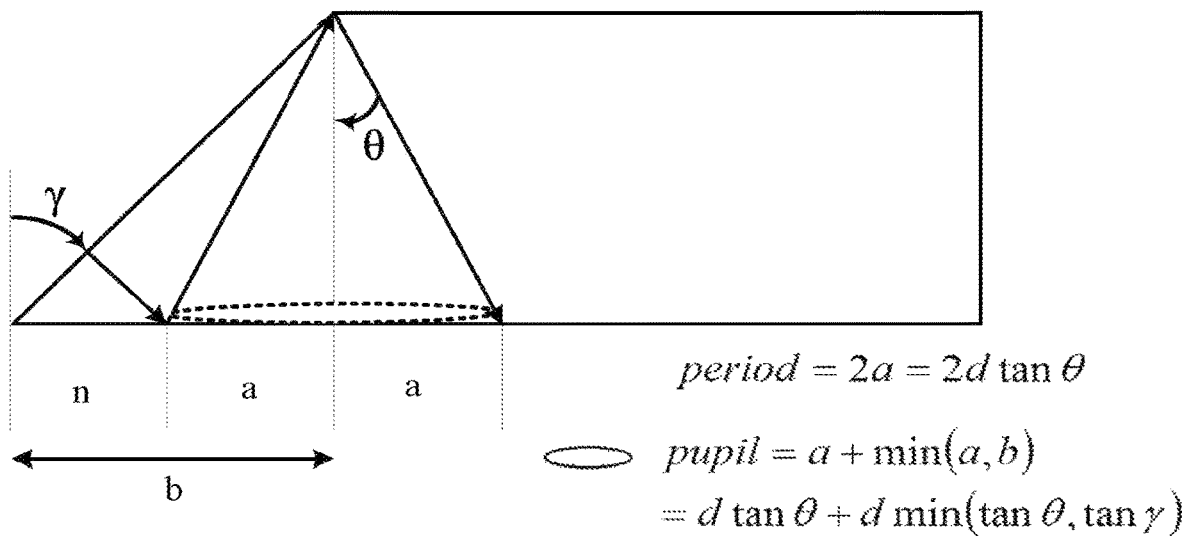
FIG. 22 — 2200

INPUT COUPLING

CROSS-REFERENCE TO RELATED PATENT APPLICATIONS

This application is a continuation of U.S. patent application Ser. No. 15/826,661, filed Nov. 29, 2017, which claims the benefit of U.S. Provisional Patent Application No. 62/427,727, filed Nov. 29, 2016, and U.S. Provisional Patent Application No. 62/505,002, filed May 11, 2017, each of which has been incorporated by reference herein in their entireties.

FIELD OF TECHNOLOGY

The present disclosure relates generally to optical devices, and more specifically to coupling light into optical reflective devices.

BACKGROUND

In-coupling light to a waveguide of an optical device can present various challenges. Depending on the image to be guided, the size of the waveguide, and/or grating structures to be used in the waveguide, different challenges may exist. Conventional input couplers may cause a waveguide to provide suboptimal image projection and retard optical clarity at the yielded field of view (FOV) of a resulting image output of the optical device. Such results may be particularly acute in optical devices used in head mounted display (HMD) devices. Accordingly, improved input coupling is desired to overcome challenges discovered when in-coupling image light to a waveguide of an optical device.

SUMMARY

The described features generally relate to one or more improved methods, systems, or devices for in-coupling light beams (e.g., modes) comprising an entrance pupil of an image projection system into a total internal reflection (TIR) waveguide. Some methods, systems, or devices include directly coupling image light into an edge or surface of a TIR waveguide. Some methods, systems, or devices include coupling image light into an input coupling element (e.g., a prism, a truncated prism, input coupling window, a portion of a waveguide surface, a portion of a substrate surface of a waveguide, a portion of a grating medium surface of a waveguide, diffractive gratings within a grating medium layer of a waveguide, etc.). In some examples of the subject technology, the input coupling element may be non-diffractive. In some examples, a non-diffractive input coupling element may be directly coupled (or operatively coupled via an optical path including another coupling element) to an edge or a surface of the waveguide.

Some methods, systems, or devices include reflecting the in-coupling image light out of the waveguide. In some examples, an output coupling device for reflecting the in-coupling image light may include diffractive gratings structured as holographic optical elements using skew mirror technology and principles (e.g., volume holograms), holographic optical elements not using skew mirror technology and principles (e.g., thin holograms), non-holographic diffractive optical elements, and/or louvered mirrors.

In an embodiment, an optical device or optical system may include a first layer of a TIR waveguide, a second layer of the TIR waveguide coupled to the first layer, the second layer comprising an output coupling optical device configured to reflect light toward an exit face of the TIR waveguide and out of the TIR waveguide, the output coupling optical device comprising one or more diffractive gratings and an input coupling face disposed on a non-diffractive edge portion of at least one of the first layer or the second layer, the input coupling face configured to receive image light.

In an embodiment, an optical system may include a first layer of a TIR waveguide, a second layer of the TIR waveguide coupled to the first layer, the second layer comprising an output coupling optical device configured to reflect light toward an exit face of the TIR waveguide and out of the TIR waveguide, the output coupling optical device comprising one or more diffractive gratings and an input coupling face disposed on a non-diffractive edge portion of at least one of the first layer or the second layer, the input coupling face configured to receive image light.

In some examples of the optical device or optical system described above, the first layer may have an index of refraction different from an index of refraction of the second layer, and the input coupling face may be disposed on a non-diffractive edge portion of the first layer exclusive of the second layer.

In some examples of the optical device or optical system described above, the first layer may have an index of refraction different from an index of refraction of the second layer, and the input coupling face may be disposed on a non-diffractive edge portion of the second layer exclusive of the first layer.

In some examples of the optical device or optical system described above, the first layer may have an index of refraction that may be index matched with an index of refraction of the second layer, and the input coupling face may be disposed on a non-diffractive edge portion of both the first layer and the second layer.

In some examples of the optical device or optical system described above, a third layer of the TIR waveguide may be coupled to the second layer, and the third layer may have an index of refraction that may be index matched with both an index of refraction of the first layer and an index of refraction of the second layer, and where the input coupling face may be disposed on a non-diffractive edge portion of the first layer, the second layer, and the third layer.

In some examples of the optical device or optical system described above, a third layer of the TIR waveguide may be coupled to the second layer, where the input coupling face may be disposed on a non-diffractive edge portion of the first layer exclusive of the second layer, and the first layer may be thicker than at least one of the third layer and the second layer.

In some examples of the optical device or optical system described above, a non-diffractive input coupling element may be coupled to a surface portion of the first layer, proximal to a non-diffractive edge portion of the first layer, and where the input coupling face may be disposed on the non-diffractive edge portion of the first layer exclusive of the second layer and a surface portion of the non-diffractive input coupling element.

Some examples of the optical device or optical system described above may also include one or more projection optics configured to direct the image light to form an entrance pupil beyond the input coupling face and within the non-diffractive input coupling element and the non-diffractive edge portion of the first layer.

In some examples of the optical device or optical system described above, the one or more diffractive gratings of the output coupling optical device may comprise a volume hologram structured to be Bragg-matched for a first internal incidence angle of in-coupled image light of a first wavelength, within a TIR range of the TIR waveguide, and where the volume hologram may be structured to be Bragg-mismatched for a second internal incidence angle of the in-coupled image light of the first wavelength within the TIR range of the TIR waveguide.

In some examples of the optical device or optical system described above, the output coupling optical device may comprise a grating medium within the second layer that may be at least 70 μm thick, and where the one or more diffractive gratings of the output coupling optical device may be disposed within the grating medium and comprise a plurality of volume holograms structured to be Bragg-matched for at least some internal incidence angles of in-coupled image light within a TIR range of the TIR waveguide.

In some examples of the optical device or optical system described above, the one or more diffractive gratings of the output coupling optical device may comprise a plurality of volume holograms configured to reflect in-coupled light about a reflective axis offset from a surface normal of the exit face of the TIR waveguide, for at least some internal incidence angles of the in-coupled light, and where an angle that the reflective axis may be offset from the surface normal of the exit face of the TIR waveguide may be approximately half the angular dimension of an angle that surface normal of the input coupling face may be offset with respect to the surface normal of the exit face the TIR waveguide.

In an embodiment, an optical device or optical system may include a first layer of a TIR waveguide, a second layer of the TIR waveguide coupled to the first layer, the second layer comprising an output coupling optical device configured to reflect light toward an exit face of the TIR waveguide and out of the TIR waveguide, the output coupling optical device comprising one or more diffractive gratings and an input coupling face disposed on a non-diffractive input coupling element, the input coupling face configured to receive image light and the non-diffractive input coupling element positioned in an optical path for directing the image light to the TIR waveguide.

In an embodiment, an optical system may include a first layer of a TIR waveguide, a second layer of the TIR waveguide coupled to the first layer, the second layer comprising an output coupling optical device configured to reflect light toward an exit face of the TIR waveguide and out of the TIR waveguide, the output coupling optical device comprising one or more diffractive gratings and an input coupling face disposed on a non-diffractive input coupling element, the input coupling face configured to receive image light and the non-diffractive input coupling element positioned in an optical path for directing the image light to the TIR waveguide.

In some examples of the optical device or optical system described above, the non-diffractive input coupling element may be coupled to an edge of the first layer and an edge of the second layer, and where the edge of the second layer may be adjacent to the edge of the first layer.

Some examples of the optical device or optical system described above may also include one or more projection optics configured to direct the image light to form an entrance pupil beyond the input coupling face and within the second layer exclusive of first layer.

In some examples of the optical device or optical system described above, a light barrier element may be disposed between the edge of the first layer and an edge-facing surface of the non-diffractive input coupling element different from the input coupling face.

In some examples of the optical device or optical system described above, the non-diffractive input coupling element may be coupled to a surface of the first layer.

Some examples of the optical device or optical system described above may also include one or more projection optics configured to direct image light to form an entrance aperture that may have a width that may be approximately twice a width of the TIR waveguide.

In some examples of the optical device or optical system described above, a non-diffractive duct coupling element may be coupled to a surface portion of the first layer, and the non-diffractive input coupling element may be coupled to a surface of the non-diffractive duct coupling element.

In some examples of the optical device or optical system described above, a partially reflective coating element may be disposed between the non-diffractive duct coupling element and the surface portion of the first layer.

In some examples of the optical device or optical system described above, a width of the non-diffractive duct coupling element may be less than or equal to a width of the TIR waveguide.

In some examples of the optical device or optical system described above, the one or more diffractive gratings of the output coupling optical device may comprise a volume hologram structured to be Bragg-matched for a first internal incidence angle of in-coupled image light of a first wavelength, within a TIR range of the TIR waveguide, and where the volume hologram may be structured to be Bragg-mismatched for a second internal incidence angle of the in-coupled image light of the first wavelength, within the TIR range of the TIR waveguide.

In some examples of the optical device or optical system described above, the output coupling optical device may comprise a grating medium within the second layer that may be at least 70 μm thick, and where the one or more diffractive gratings of the output coupling optical device may be disposed within the grating medium and comprise a plurality of volume holograms structured to be Bragg-matched for at least some internal incidence angles of in-coupled image light within a TIR range of the TIR waveguide.

In some examples of the optical device or optical system described above, the one or more diffractive gratings of the output coupling optical device may comprise a plurality of volume holograms configured to reflect in-coupled light about a reflective axis offset from a surface normal of the exit face of the TIR waveguide, for at least some internal incidence angles of the in-coupled light, and where an angle that the reflective axis may be offset from the surface normal of the exit face of the TIR waveguide may be approximately half the angular dimension of an angle that surface normal of the input coupling face may be offset with respect to the surface normal of the exit face of the TIR waveguide.

In one embodiment, an optical device or optical system may include the second layer comprising: an input coupling element configured to reflect in-coupled image light within the TIR waveguide, the input coupling element comprising one or more diffractive gratings, an output coupling optical device configured to reflect the in-coupled image light toward an exit face of the TIR waveguide and out of the TIR waveguide, the output coupling optical device comprising one or more diffractive gratings, and an input coupling face disposed on a surface on the first layer, the input coupling face configured to receive the in-coupled image light.

In one embodiment, an optical system may include a second layer comprising: an input coupling element configured to reflect in-coupled image light within the TIR waveguide, the input coupling element comprising one or more diffractive gratings, an output coupling optical device configured to reflect the in-coupled image light toward an exit face of the TIR waveguide and out of the TIR waveguide, the output coupling optical device comprising one or more diffractive gratings, and an input coupling face disposed on a surface on the first layer, the input coupling face configured to receive the in-coupled image light.

In some examples of the optical device or optical system described above, the one or more diffractive gratings of the input coupling element may comprise a volume hologram structured to be Bragg-matched for a first internal incidence angle of in-coupled image light of a first wavelength within a TIR range of the TIR waveguide, and where the volume hologram may be structured to be Bragg-mismatched for a second internal incidence angle of the in-coupled image light of the first wavelength within the TIR range of the TIR waveguide.

In some examples of the optical device or optical system described above, the input coupling element may comprise a first grating medium portion and the output coupling optical device may comprise a second grating medium portion, the first grating medium portion and the second grating medium portion being within the second layer that may be at least 70 μm thick, and where the one or more diffractive gratings of the input coupling element may be disposed within the first grating medium portion and comprise a first plurality of volume holograms structured to be Bragg-matched for at least some internal incidence angles within a TIR range of the TIR waveguide of in-coupled image light that enters the input coupling face, and where the one or more diffractive gratings of the output coupling optical device may be disposed within the second grating medium portion and comprise a second plurality of volume holograms structured to be Bragg-matched for at least some internal incidence angles within the TIR range of reflected in-coupled image light.

In some examples of the optical device or optical system described above, an angle of a first reflective axis offset from a surface normal of the input coupling face of the TIR waveguide corresponding to a first plurality of volume holograms may have approximately the same angular dimension as an angle of a second reflective axis offset from a surface normal of the exit face of the TIR waveguide corresponding to a second plurality of volume holograms.

BRIEF DESCRIPTION OF THE DRAWINGS

A further understanding of the nature and advantages of implementations of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 8 illustrates an example of an optical device and system that supports edge-coupled input coupling techniques in accordance with various aspects of the present disclosure.

FIG. 9 illustrates an example of an optical device and system that supports edge-coupled input coupling techniques in accordance with various aspects of the present disclosure.

FIG. 21 illustrates an example of an optical device that supports edge-coupled input coupling techniques in accordance with various aspects of the present disclosure.

FIG. 22 illustrates an example of edge-coupled input coupling techniques in accordance with various aspects of the present disclosure.

DETAILED DESCRIPTION

Figure 1:
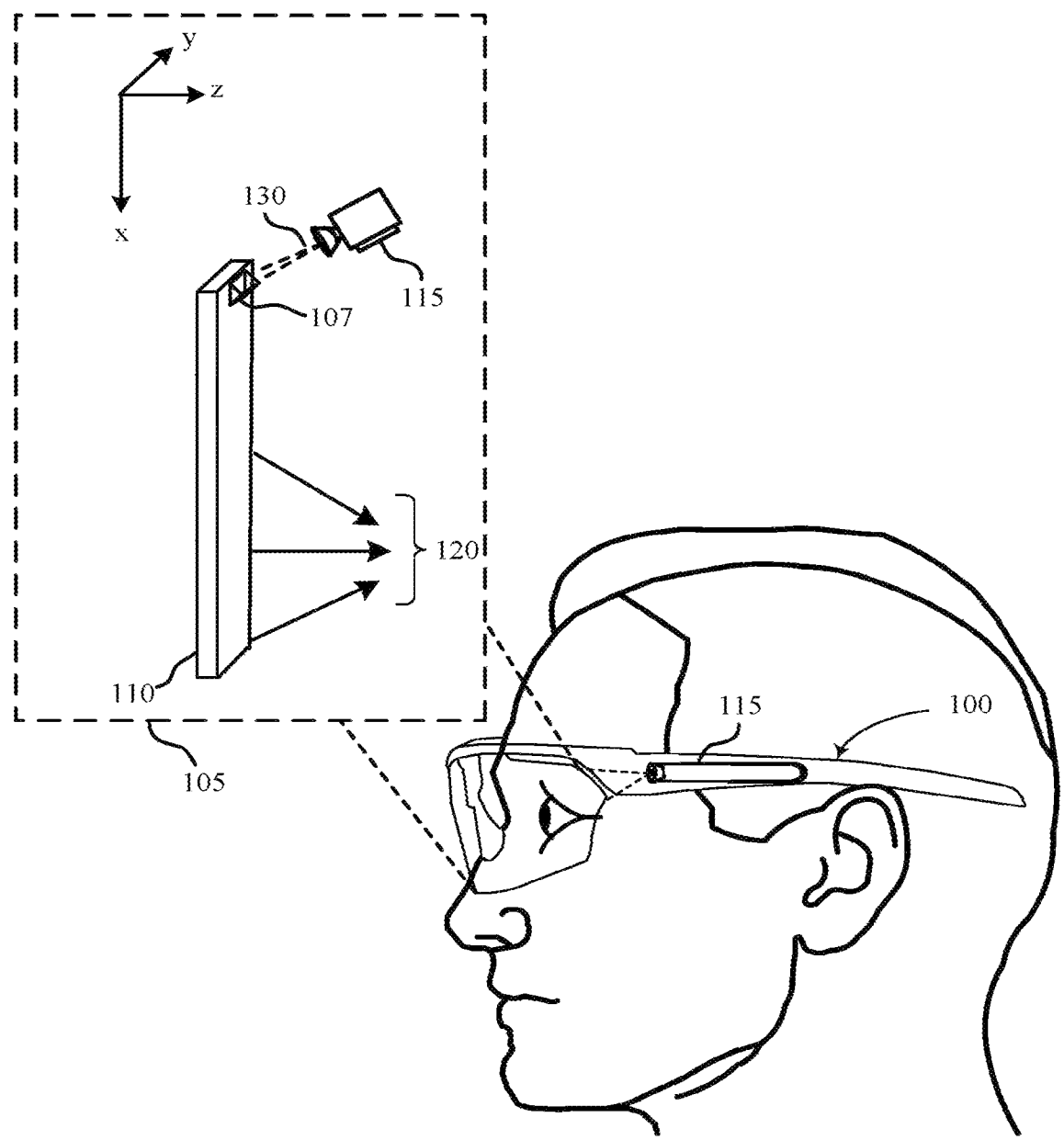
FIG. 1 is an illustration of an HMD device in which the input coupling principles included herein may be implemented.

In certain conventional devices, a waveguide may include an output coupler that uses conventional diffraction grating structures. For example, certain conventional diffractive grating structures can reflect light about a reflective axis that differs from surface normal of the medium in which the grating structure resides. However, for a given angle of incidence, angles of reflection for certain conventional diffractive grating structures typically co-vary with wavelength of incident light. However, where a substantially constant reflective axis is beneficial (e.g., to limit the effects of dispersion and/or polarization), certain conventional diffractive grating structures may be substantially limited to a single wavelength (or very narrow range of wavelengths) for a given angle of incidence. Similarly, in order to reflect light of a specified wavelength about a constant reflective axis, certain conventional diffraction grating structures may be limited to a single angle of incidence (or very narrow range of incidence angles). In light of these constraints and other considerations associated with conventional diffractive grating structures, a waveguide having an output coupler that uses conventional grating structures typically requires an input coupler that also uses of conventional diffractive grating structures.

In some examples of the subject technology, volumetric holographic gratings may be used in an output coupling device for reflecting light out of a TIR waveguide. Input coupling image light to the TIR waveguide may be performed with one or more non-diffractive optical elements. For example, image light may be directly edge-coupled to a non-diffractive input coupling element that is a portion of the TIR waveguide such as, but not limited to, an edge of one or more layers including media layers and/or substrate layers of a waveguide, or a beveled edge of a substrate layer of a waveguide. Additionally or alternatively, image light may be directly edge-coupled to a non-diffractive input coupling element that is an adjunct optical element (e.g., a prism, parallel plate element, or the like) coupled to an edge of the waveguide. In some examples, image light may be surface-coupled to a TIR waveguide via an optical path included a non-diffractive input coupling element (e.g., a prism, truncated prism, parallel plate element, duct coupling element, or the like). A non-diffractive input coupling element may have a surface that is coupled to (e.g., adhered to or integrated with) a surface of the waveguide (e.g., a substrate layer). One or more non-diffractive input coupling elements may be used for in-coupling image light to the TIR waveguide in some examples.

Input coupling techniques may be applied to an optical device or image projection system including waveguide and/or non-diffractive input coupling element in conjunction with one or more projection optics. In some examples, the projection optics may direct light to an input coupling face disposed on a non-diffractive edge portion of a waveguide layer or a non-diffractive input coupling element directly or operatively coupled to a of a waveguide layer. The projection optics and/or cooperating optical element may be configured to form an entrance pupil at a particular location of the optical device advantageous to a specific application of the image projection system. Additionally or alternatively, input coupling techniques may include configuring dimensions and/or properties of various optical elements to optimize pupil replication or light homogenization effects in an optical device as described herein. In some examples, the one or more properties of the various optical elements used in input coupling techniques include, but are not limited to, a thickness and bulk index of refraction, an accessible TIR input angle range, and yielded FOV capability of geometrical arrangements of various optical elements within and coupled to the TIR waveguide.

Additionally or alternatively, image light may be input coupled to the waveguide via an optical path that traverses a single internal layer boundary from the internal layer boundaries formed by the plurality of layers comprising the waveguide. For example, image light may be in-coupled and directed to cross only an internal layer boundary of the waveguide formed by adjoining internal surfaces of a substrate layer (e.g., a top substrate or a bottom substrate) and a media layer. Directing the in-coupled light via an optical path to initially traverse a single internal layer boundary may advantageously limit adverse effects caused by index of refraction mismatches between layers (e.g., substrate and media layers) of the waveguide.

In accordance with some examples of the subject technology, one or both of an input coupling element and an output coupling device of a waveguide may use volumetric holographic gratings. For example, an input coupling element that uses conventional diffraction grating structures may be paired with an output coupling device that uses volumetric holographic gratings. In some examples, an input coupling element that uses volumetric holographic gratings may be paired with an output coupling device that uses conventional diffraction grating structures. Conventional diffraction grating structures may include embossed diffractive gratings, diffractive optical elements, thin holographic optical elements, and angled partially reflective surfaces to support at least the aforementioned coupling features of a waveguide. In other examples, an input coupling element that uses volumetric holographic gratings may be paired with an output coupling device that uses volumetric holographic gratings.

The aforementioned description provides examples, and is not intended to limit the scope, applicability or configuration of implementations of the principles described herein. Rather, the ensuing description will provide those skilled in the art with an enabling description and examples for implementing various embodiments of the principles described herein. Various changes may be made in the function and arrangement of elements.

Thus, various implementations may omit, substitute, or add various procedures or components as appropriate. For instance, it should be appreciated that the methods may be performed in an order different than that described, and that various steps may be added, omitted or combined. Also, aspects and elements described with respect to certain implementations may be combined in various other implementations. It should also be appreciated that the following input coupling techniques and optical devices may individually or collectively be components of a larger optical system.

Accordingly, other procedures as would be understood by one skilled in the art given the benefit of the present disclosure may take precedence over or otherwise modify their application.

FIG. 1 is an illustration of an HMD device 100 in which the principles included herein may be implemented. The HMD device 100 may include eyewear or headwear in which a near-eye display (NED) 105 may be affixed in front of a user's eyes. The NED 105 may include a diffractive element portion disposed within or incorporated with a lens assembly of the HMD device 100. In some examples, the diffractive element portion may be a holographic optical element, which may be comprised of a skew mirror 110. Coordinates (x, y, and z-axis) are provided with reference to the skew mirror 110. The HMD device 100 may include a non-diffractive input coupling prism 107. Non-diffractive input coupling prism 107 may be coupled to a surface of skew mirror 110. The HMD 100 may also include a light source or light projector 115 operatively coupled to the lens assembly. In some examples, light source or light projector 115 may be operatively coupled to the lens assembly in a waveguide configuration. In some examples, light projector 115 (or similar light source) may be operatively coupled to the lens assembly in a free space configuration.

In some examples, light projector 115 may be included in one or more projection optics that are configured to direct light to the non-diffractive input coupling prism 107. In other examples, light projector 115 may be included in one or more projection optics that are configured to direct light to a non-diffractive input coupling edge (not shown) of a glass substrate of skew mirror 110. In other examples, light projector 115 may be included in one or more projection optics that are configured to direct light to an input coupling element (not shown) comprising diffractive gratings different from the holographic optical element for reflecting light out of skew mirror 110 toward a user's eye.

The skew mirror 110 may be a reflective device and may include a grating medium within which resides one or more volume holograms or other grating structures. The skew mirror 110 may include an additional layer such as a glass cover or glass substrate. The additional layer may serve to protect the grating medium from contamination, moisture, oxygen, reactive chemical species, damage, and the like. The additional layer may also be refractive index matched with the grating medium. The grating medium, by virtue of the grating structure residing therein, may have physical properties that allow the medium to diffract light about an axis, referred to as a reflective axis, where the angle of diffraction (henceforth referred to as angle of reflection) varies by less than 1° for multiple wavelengths of light incident upon the grating medium at a given angle of incidence. In some cases, the reflective axis is also constant for multiple wavelengths and/or angles of incidence. In some cases, the grating structure is formed by one or more holograms. The one or more holograms can be volume-phase holograms in some implementations. Other types of holograms may also be used in various implementations of the grating structure.

Similarly, implementations may have substantially constant reflective axes (i.e., reflective axes have reflective axis angles that vary by less than 1°) across a range of incidence angles for incident light of a given wavelength, and this phenomenon may be observed with incident light at various wavelengths. In some implementations, the reflective axes remain substantially constant for every combination of a set of multiple incidence angles and a set of multiple wavelengths.

A hologram may be a recording of an interference pattern, and may include both intensity and phase information from the light used for the recording. This information may be recorded in a photosensitive medium that converts the interference pattern into an optical element that modifies the amplitude or the phase of subsequent incident light beams, according to the intensity of the initial interference pattern. The grating medium may include a photopolymer, photorefractive crystals, dichromatic gelatin, photo-thermo-refractive glass, film containing dispersed silver halide particles, or other material with the ability to react to and record an incident interference pattern. In some cases, coherent laser light may be used for recording and/or reading the recorded hologram.

In some cases, a hologram may be recorded using two laser beams known as recording beams. In some cases, the recording beams may be monochromatic collimated plane wave beams that are similar to each other except for angles at which they are incident upon the grating medium. In some implementations, the recording beams may have amplitude or phase distributions that differ from each other. The recording beams may be directed so that they intersect within the recording medium. At the intersection of the recording beams, the recording beams may interact with the recording medium in a way that varies according to the intensity of each point of the interference pattern, and creates a pattern of varying optical properties within the recording medium. For example, in some embodiments, a refractive index may vary within the recording medium. In some cases, the resulting interference pattern may be spatially distributed (e.g., with a mask or the like) in a manner that is uniform for all such grating structures recorded on the grating medium. In some cases, multiple grating structures may be superimposed within a single recording medium by varying the wavelength or the angle of incidence to create different interference patterns within the recording medium. In some cases, after one or more holograms are recorded in the medium, the medium may be treated with light in a post-recording light treatment. The post recording light treatment may be performed with highly incoherent light to substantially consume remaining reactive medium components such as photoinitiator or photoactive monomer, such that photosensitivity of the recording medium is greatly reduced or eliminated. After recording of holograms or other grating structures in a recording medium has been completed, the medium is typically referred to as a grating medium. In some instances, grating mediums have been rendered non-photosensitive.

In some implementations, the grating structure may include a hologram generated via interference between multiple light beams referred to as recording beams. The grating structure may include multiple holograms. The multiple holograms may be recorded using recording beams incident upon the grating medium at angles that vary among the multiple holograms (i.e., angle multiplexed), and/or using recording beams whose wavelengths vary among the multiple holograms (i.e., wavelength multiplexed)), and/or using recording beams whose positions vary among the multiple holograms (i.e., spatially multiplexed). In some implementations, the grating structure may include a hologram recorded using two recording beams whose angles of incidence upon the grating medium vary while the hologram is being recorded, and/or whose wavelengths vary while the hologram is being recorded. Implementations further include a device wherein the reflective axis differs from surface normal of the grating medium by at least 1.0 degree; or at least by 2.0 degrees; or at least by 4.0 degrees; or at least by 9.0 degrees.

Light projector 115 may provide image-bearing light to the lens assembly. In some instances, the lens assembly and skew mirror may be substantially flat with respect to an orientation plane of the system. In other instances, the lens assembly may exhibit curvature with respect to an orientation plane. For example, in some cases, lens assembly and skew mirror 110 may be substantially flat with respect to the x-y plane. In other cases, the lens assembly may include some curvature with respect to the x-y plane in certain implementations. Reflected light 120 from skew mirror 110 may be reflected towards an eye box situated at a fixed distance along the z-axis away from skew mirror 110. In some examples, skew mirror 110 may be contained at least partially within a waveguide. The waveguide may propagate incident light 120 by total internal reflection towards the skew mirror 110. In some examples, incident light 120 may propagate by free space towards skew mirror 110. The skew mirror 110 may include a grating medium made of a photopolymer. The skew mirror 110 may also include one or more grating structures within the grating medium. Each grating structure may include one or more sinusoidal volume gratings which may overlap with each other. A grating structure may be configured to reflect light of a particular wavelength about a reflective axis offset from a surface normal of the grating medium at a particular plurality of incidence angles. Each grating structure within the grating medium may be configured to reflect a portion of light toward an exit pupil in the eye box at a fixed distance from the waveguide.

Each grating structure may reflect light in a manner different from another grating structure. For example, a first grating structure may reflect incident light of a first wavelength at a first incidence angle, whereas a second grating structure may reflect incident light of a second wavelength at the first incidence angle (e.g., different grating structures may be configured to reflect different wavelengths of light for incident light of the same incidence angle). Also, a first grating structure may reflect incident light of a first wavelength at a first incidence angle, whereas a second grating structure may reflect incident light of the first wavelength at a second incidence angle (e.g., different grating structures may be configured to reflect the same wavelength of light for incident light of different incidence angles). Furthermore, a grating structure may reflect first incident light of a first wavelength and first incidence angle, and the grating structure may reflect second incident light at a second wavelength and second incidence angle about the same reflective axis. In this manner, different grating structures can be used to selectively reflect a particular wavelength of light for incident light at a range of incidence angles. The different grating structures may be super-imposed within the grating medium of the skew mirror 110. The skew mirror 110 may have a substantially constant reflective axis (i.e., each grating structure of the skew mirror 110 has a same substantially constant reflective axis).

In some examples, skew mirror 110 may be disposed within a TIR waveguide having multiple layers. A first layer of the TIR waveguide may include a glass substrate, and a second layer may be coupled to the first layer. The second layer may be filled with holographic polymer and include a grating medium of the skew mirror 110. Skew mirror 110 may reflect light toward an exit face (e.g., an external surface portion or area of the first layer above the skew mirror 110 in the z-direction) of the TIR waveguide. Light projector 115 may provide image-bearing light to an input coupling face disposed on the non-diffractive input coupling prism 107, which may be coupled to the glass substrate.

A TIR waveguide with an input coupling element configured for edge or surface coupling into the TIR waveguide may advantageous for an augmented reality waveguide optic applications such as those used in an HMD device or system. In some implementations, a single large pupil (or classically replicated pupil) may be coupled into a TIR waveguide comprising an output coupling device such as a skew mirror. In some implementations, a single (or small number) of miniature pupils may be coupled into cross-coupler (1-D pupil expander). The cross-coupler may be comprised of a plurality of volume holographic gratings applied using skew mirror technology. The cross-coupler may diffract in-coupled image light into a second TIR waveguide (or second portion of the same TIR waveguide). The second waveguide (or portion of the single waveguide) may include the output coupling device. Other configurations and examples of input coupling techniques described herein may be applied to the HMD device or system described in the example of FIG. 1.

Figure 2A:
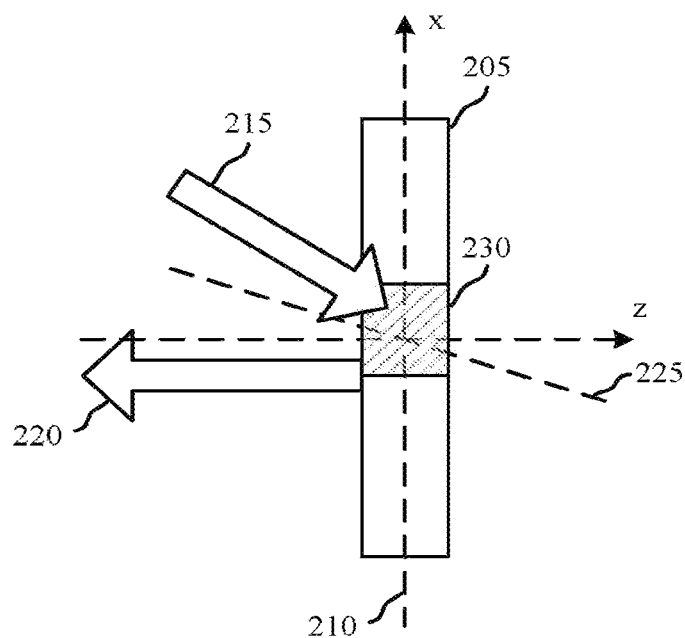
FIG. 2A is a diagram illustrating reflective properties of a skew mirror in real space in accordance with various aspects of the present disclosure.

FIG. 2A is a cross-section view 200 illustrating reflective properties of a skew mirror 205 in real space according to an example. The cross-section view 200 may include a grating structure such as hologram 230 in a grating medium. FIG. 2A omits skew mirror components other than the grating medium, such as an additional layer that might serve as a substrate or protective layer for the grating medium. The substrate or protective layer may serve to protect the grating medium from contamination, moisture, oxygen, reactive chemical species, damage, and the like. One or more skew mirrors may be configured or structured to selectively reflect rays of light to various portions of an optical device (e.g., redirecting light toward a TIR waveguide in an input coupler configuration and/or forming an exit pupil towards an eye box of the optical device in an output coupler configuration).

The skew mirror 205 may be characterized by reflective axis 225, at an angle measured with respect to the z-axis. The z-axis may be normal to the skew mirror surface. The skew mirror 205 is illuminated with the incident light 215 with an internal incidence angle that is measured with respect to the z-axis. The principal reflected light 220 may be reflected with internal reflection angle 180° measured with respect to the z-axis. The principal reflected light 220 may correspond to wavelengths of light residing in the red, green, and blue regions of the visible spectrum.

The skew mirror 210 may be characterized by the reflective axis 225, at an angle measured with respect to the z-axis. The z-axis is normal to the skew mirror 205 axis. The skew mirror 210 is illuminated with the incident light 215 with an internal incidence angle that is measured with respect to the z-axis. The principal reflected light 220 may be reflected with internal reflection angle axis substantially normal to the surface of skew mirror 210. In some examples, the principal reflected light 220 may correspond to wavelengths of light residing in the red, green, and blue regions of the visible spectrum. For example, the red, green, and blue regions of the visible spectrum may include a red wavelength (e.g., 610-780 nm) band, green wavelength (e.g., 493-577 nm) band, and blue wavelength (e.g., 405-492 nm) band. In other examples, the principal reflected light 220 may correspond to wavelengths of light residing outside of the visible spectrum (e.g., infrared and ultraviolet wavelengths).

Figure 2B:
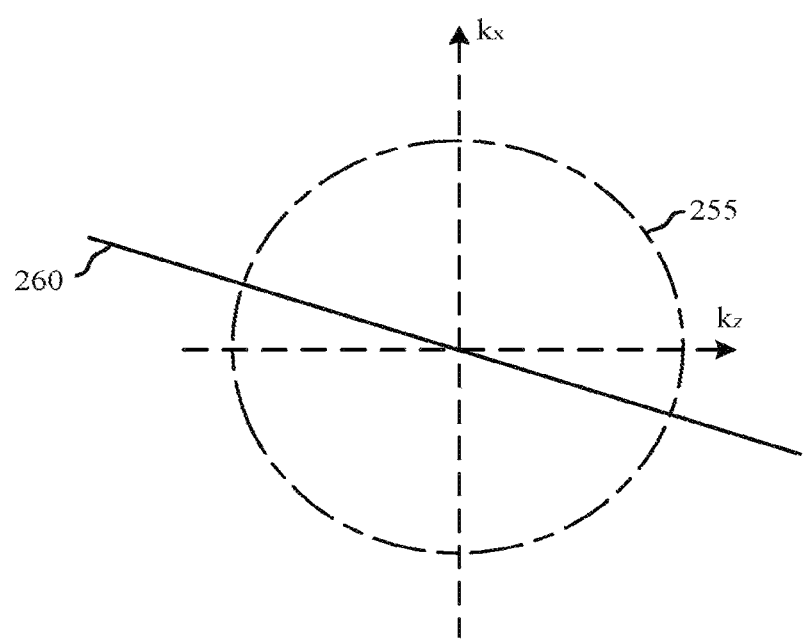
FIG. 2B illustrates a skew mirror in k-space in accordance with various aspects of the present disclosure.

FIG. 2B illustrates a k-space representation 250 of the skew mirror 210 of FIG. 2A. The k-space distributions of spatially varying refractive index components are typically denoted $\Delta n(\vec{k})$. $\Delta n(\vec{k})$ k-space distribution 260 may pass through the origin, at an angle equal to reflective axis 225, measured with respect to the z-axis. Recording k-sphere 255 may be the k-sphere corresponding to a particular writing wavelength. K-space representation 250 may include various k-spheres corresponding to wavelengths of light residing in the red, green, and blue regions of the visible spectrum.

The k-space formalism may represent a method for analyzing holographic recording and diffraction. In k-space, propagating optical waves and holograms may be represented by three dimensional Fourier transforms of their distributions in real space. For example, an infinite collimated monochromatic reference beam may be represented in real space and k-space by equation (1):

$$E_r(\vec{r}) = A_r \exp(i\vec{k}_r \cdot \vec{r}) \xrightarrow{\mathcal{F}} E_r(\vec{k}) = A_r \delta(\vec{k} - \vec{k}_r) \tag{1}$$

where $E_r(\vec{r})$ is the optical scalar field distribution at all $\vec{r} = \{x, y, z\}$ 3D spatial vector locations, and the transform $E_r(\vec{k})$ of the distribution, is the optical scalar field distribution at all $\vec{k} = \{k_x, k_y, k_z\}$ 3D spatial frequency vectors. A, may represent the scalar complex amplitude of the field; and $\vec{k}_r$ may represent the wave vector, whose length indicates the spatial frequency of the light waves, and whose direction indicates the direction of propagation. In some implementations, all beams may be composed of light of the same wavelength, so all optical wave vectors may have the same length, i.e., $|\vec{k}_r| = k_n$. Thus, all optical propagation vectors may lie on a sphere of radius $k_n = 2\pi n_0/\lambda$, where $n_0$ is the average refractive index of the hologram ("bulk index"), and $\lambda$ is the vacuum wavelength of the light. This construct is known as the k-sphere. In other implementations, light of multiple wavelengths may be decomposed into a superposition of wave vectors of differing lengths, lying on different k-spheres.

Another important k-space distribution is that of the holograms themselves. Volume holograms may consist of spatial variations of the index of refraction within a grating medium. The index of refraction spatial variations, typically denoted $\Delta n(\vec{r})$, can be referred to as index modulation patterns, the k-space distributions of which may be denoted $\Delta n(\vec{k})$. The index modulation pattern may be created by interference between a first recording beam and a second recording beam is typically proportional to the spatial intensity of the recording interference pattern, as shown in equation (2):

$$\Delta n(\vec{r}) \propto |E_1(\vec{r}) + E_2(\vec{r})|^2 = |E_1(\vec{r})|^2 + |E_2(\vec{r})|^2 + E_1^*(\vec{r})E_2(\vec{r}) + E_1(\vec{r})E_2^*(\vec{r}) \tag{2}$$

where $E_1(\vec{r})$ is the spatial distribution of the signal first recording beam field and $E_2(\vec{r})$ is the spatial distribution of the second recording beam field. The unary operator * denotes complex conjugation. The final term in equation (2), $E_1(\vec{r})E_2^*(\vec{r})$, may map the incident second recording beam into the diffracted first recording beam. Thus the following equation may result:

$$E_1(\vec{r})E_2^*(\vec{r}) \xrightarrow{\mathcal{F}} E_1(\vec{k}) \otimes E_2(\vec{k}), \tag{3}$$

where $\otimes$ is the 3D cross correlation operator. This is to say, the product of one optical field and the complex conjugate of another in the spatial domain may become a cross correlation of their respective Fourier transforms in the frequency domain.

Typically, the hologram 230 constitutes a refractive index distribution that is real-valued in real space. Locations of $\Delta n(\vec{k})$ k-space distributions of the hologram 230 may be determined mathematically from the cross-correlation operations $E_2(\vec{k}) \otimes E_1(\vec{k})$ and $E_1(\vec{k}) \otimes E_2(\vec{k})$, respectively, or geometrically from vector differences $\vec{K}_{G+} = \vec{k}_1 - \vec{k}_2$ and $\vec{K}_{G-} = \vec{k}_2 - \vec{k}_1$, where $\vec{K}_{G+}$ and $\vec{K}_{G-}$ may represent grating vectors from the respective hologram $\Delta n(\vec{k})$ k-space distributions to the origin (not shown individually). Note that by convention, wave vectors are represented by a lowercase "k," and grating vectors by uppercase "K."

Once recorded, the hologram 230 may be illuminated by a probe beam to produce a diffracted beam. For purposes of the present disclosure, the diffracted beam can be considered a reflection of the probe beam, which can be referred to as an incident light beam (e.g., image-bearing light). The probe beam and its reflected beam may be angularly bisected by the reflective axis 225 (i.e., the angle of incidence of the probe beam relative to the reflective axis has the same magnitude as the angle of reflection of the reflected beam relative to the reflective axis). The diffraction process can be represented by a set of mathematical and geometric operations in k-space similar to those of the recording process. In the weak diffraction limit, the diffracted light distribution of the diffracted beam is given by equation (4), $$E_d(\vec{k}) \propto \Delta n(\vec{k}) * E_p(\vec{k})||\vec{k}|=k_n, \tag{4}$$

where $E_d(\vec{k})$ and $E_p(\vec{k})$ are k-space distributions of the diffracted beam and the probe beam, respectively; and "*" is the 3D convolution operator. The notation "$||\vec{k}|=k_n$" indicates that the preceding expression is evaluated only where $|\vec{k}|=k_n$, i.e., where the result lies on the k-sphere. The convolution $\Delta n(\vec{k}) * E_p(\vec{k})$ represents a polarization density distribution, and is proportional to the macroscopic sum of the inhomogeneous electric dipole moments of the grating medium induced by the probe beam, $E_p(\vec{k})$.

In some cases, when the probe beam resembles one of the recording beams used for recording, the effect of the convolution may be to reverse the cross correlation during recording, and the diffracted beam may substantially resemble the other recording beam used to record a hologram. When the probe beam has a different k-space distribution than the recording beams used for recording, the hologram may produce a diffracted beam that is substantially different than the beams used to record the hologram. Note also that while the recording beams are typically mutually coherent, the probe beam (and diffracted beam) is not so constrained. A multi-wavelength probe beam may be analyzed as a superposition of single-wavelength beams, each obeying Equation (4) with a different k-sphere radius.

Persons skilled in the art given the benefit of the present disclosure will recognize that the term probe beam, used when describing skew mirror properties in k-space, is analogous to the term incident light, which is used when describing skew mirror reflective properties in real space. Similarly, the term diffracted beam, used when describing skew mirror properties in k-space, is analogous to the term principal reflected light, used when describing skew mirror properties in real space. Thus when describing reflective properties of a skew mirror in real space, it may be typical to state that incident light is reflected by a hologram (or other grating structure) as principal reflected light, though to state that a probe beam is diffracted by the hologram to produce a diffracted beam is synonymous. Similarly, when describing reflective properties of a skew mirror in k-space, it is typical to state that a probe beam is diffracted by a hologram (or other grating structure) to produce a diffracted beam, though to state that incident light is reflected by the grating structure to produce principal reflected light has the same meaning in the context of implementations of the present disclosure.

Figure 3:
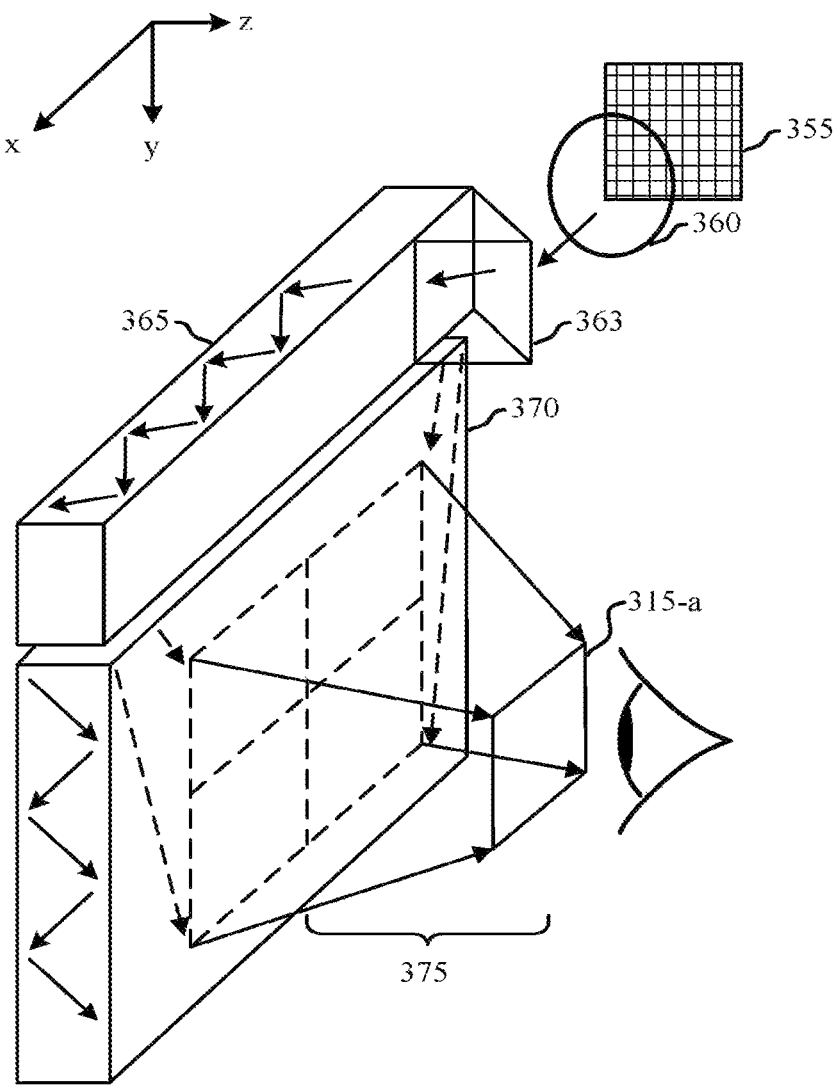
FIG. 3 is a diagram of an optical system incorporating input coupling techniques in accordance with various aspects of the present disclosure.

FIG. 3 is a diagram of an optical system 300 incorporating input coupling techniques with a two-dimensional skew mirror configuration in accordance with various aspects of the disclosure. Optical system 300 may be utilized in an HMD, augmented reality (AR), or virtual reality (VR) application such as, but not limited to, the HMD 100 of FIG. 1. In some examples, optical system 300 may employ selective coupling to allow a skew mirror 305 to diffract light towards a specific location, such as an eye box 315-$a$, thereby improving photometric efficiency (e.g., image brightness). Selective coupling may have an advantageous effect of producing an external exit pupil at the eye box 315-$a$. The exit pupil may be a fixed distance from the skew mirror 305. An external exit pupil may increase optical efficiency relative to an internal exit pupil. The represented angles are internal angles relative to the surface normal of the grating medium, and that refraction at the grating medium and/or the substrate interface, as well as at the substrate air interface, is ignored for the purpose of illustration.

Optical system 300 may include a display 355, a collimator 360, a prism 363, a horizontal waveguide 365, a vertical waveguide 370, and an eye box 315-$a$. Eye box 315-$a$ may be a distance from the vertical waveguide 370 hereby known as the eye relief 375. Optical system 300 illustrates an example of a two-dimensional pupil expander that may utilize skew mirrors. A skew mirror disposed in horizontal waveguide 365 may be referred to as a cross coupler. In some cases, a skew mirror disposed in the vertical waveguide 370 may be referred to as an output coupler.

Some input coupling techniques described herein may be used with respect to the two-dimensional skew mirror configuration (e.g., for further expansion of an entrance pupil). For example, projection optics may include display 355 and a collimator 360 that are configured to direct the image light on an input coupling face disposed on prism 363 to form an entrance pupil. In some cases, prism 363 may be a non-diffractive optical element. Horizontal waveguide 365 may include a first skew mirror that is operatively coupled to a second skew mirror. The first skew mirror may be used to expand the pupil in a horizontal direction. In some examples, the first skew mirror (e.g., a cross coupler) may be disposed within a separate 2D (duct-type) waveguide. The second skew mirror may be used to expand the pupil in a vertical direction. In some examples, the second skew mirror (e.g., an output coupler) may be disposed within a separate 1D (slab-type) waveguide. In some examples, the first skew mirror (e.g., a cross coupler) and the second skew mirror (e.g., an output coupler) may be disposed within a single 1D (slab-type) waveguide. In some examples, the first skew mirror and the second skew mirror may abut or be otherwise operatively coupled vertically (e.g., along the y-axis). In some examples, the first skew mirror and the second skew mirror may abut or be otherwise operatively coupled horizontally (e.g., along the x-axis). In some examples, the first skew mirror and the second skew mirror may abut or be otherwise operatively coupled in an overlapping manner (e.g., along the z-axis).

Figure 4:
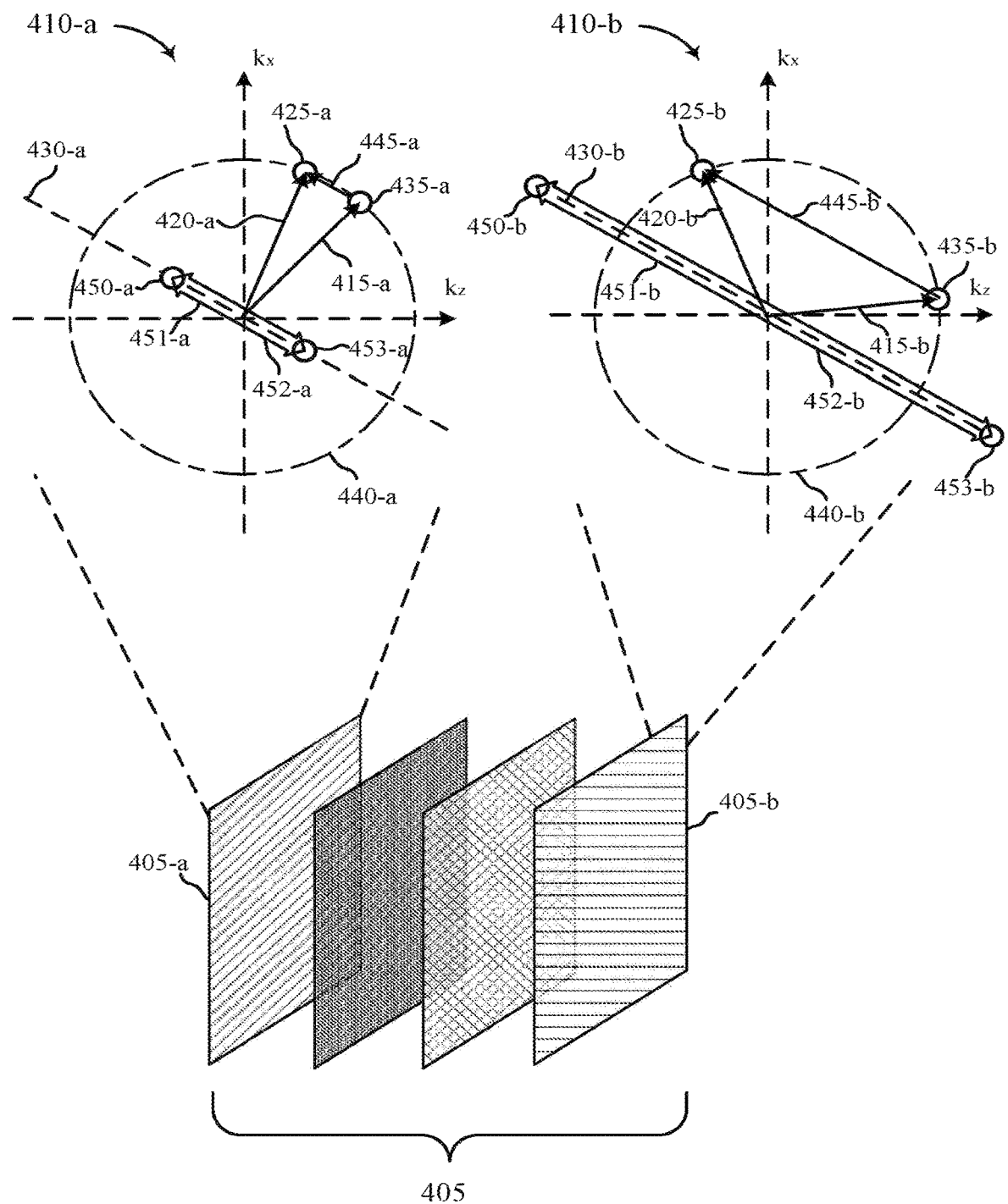
FIG. 4 is a diagram of an optical component illustrating a plurality of grating structures in accordance with various aspects of the present disclosure.

FIG. 4 is a diagram of an optical component 400 illustrating a plurality of grating structures 405. Grating structures 405 may be similar to the grating structures with a grating medium described herein. Grating structures 405 are illustrated in an exploded view manner for discussion purposes, but these grating structures 405 may overlap and intermingle within a volume or space of a grating medium as described herein. Also, each grating structure may have a different diffraction angle response and may reflect light at a wavelength that is different than another grating structure.

Optical component 400 depicts a grating structure 405-$a$ and a grating structure 405-$b$. The grating structure 405-$a$ may have a corresponding k-space diagram 410-$a$, and the grating structure 405-$b$ may have a corresponding k-space diagram 410-$b$. The k-space diagrams 410-$a$ and 410-$b$ may illustrate cases of Bragg-matched reconstruction by illuminating a hologram.

The k-space diagram 410-$a$ may illustrate the reflection of an incident light by the grating structure 405-$a$. The k-space diagram 410-$a$ is a representation of a mirror-like diffraction (which can be referred to as a reflection) of the probe beam by the hologram, where the probe beam angle of incidence with respect to the reflective axis is equal to the diffracted beam angle of reflection with respect to the reflective axis. The k-space diagram 410-$a$ may include positive sideband $4n(\vec{k})$ k-space distribution 450-$a$ that has an angle measured with respect to the z-axis, equal to that of the reflective axis 430-$a$ of the grating structure 405-$a$. The k-space diagram 410-$a$ may also include a negative sideband $\Delta n(\vec{k})$ k-space distribution 453-$a$ that has an angle measured with respect to the z-axis, equal to that of the reflective axis 430-$a$. The k-sphere 440-$a$ may represent visible blue light, visible green light, or visible red light.

The k-space diagram 410-$a$ depicts a case where probe beam 435-$a$ produces a diffracted beam k-space distribution 425-$a$, $E_d(\vec{k})$, that is point-like and lies on the probe beam 440-$a$ k-sphere. The diffracted beam k-space distribution 425-$a$ is produced according to the convolution of Equation (4).

The probe beam may have a k-space distribution 435-$a$, $E_p(\vec{k})$, that is also point-like. In this case, the probe beam is said to be "Bragg-matched" to the hologram, and the hologram may produce significant diffraction, even though the probe beam wavelength differs from the wavelength of the recording beams used to record the hologram. The convolution operation may also be represented geometrically by the vector sum $\vec{k}_d = \vec{k}_p + \vec{K}_{G+}$, where $\vec{k}_d$ represents a diffracted beam wave vector 420-$a$, $\vec{k}_p$ represents a probe beam wave vector 415-$a$, and $\vec{K}_{G+}$ represents a positive sideband grating vector 451-$a$. Vector 445-$a$ represents the sum of the probe beam wave vector 415-$a$ and the positive sideband grating vector 451-$a$ according to the convolution of Equation (4). The k-space diagram 410-$a$ also has a negative sideband grating vector 452-$a$.

The probe beam wave vector 415-$a$ and the diffracted beam wave vector 420-$a$ may form the legs of a substantially isosceles triangle. The equal angles of this triangle may be congruent with the angle of incidence and angle of reflection, both measured with respect to the reflective axis 430-a. Thus, the grating structure 405-a may reflect light in a substantially mirror-like manner about the reflective axis 430-a.

The k-space diagram 410-b may illustrate the reflection of an incident light by the grating structure 405-b. The grating structure 405-b may reflect incident light at a plurality of incidence angles that are different than the incidence angles reflected by the grating structure 405-a. The grating structure 405-b may also reflect light at a different wavelength than the grating structure 405-a. The k-space diagram 410-b may be a representation of a mirror-like diffraction (which can be referred to as a reflection) of the probe beam by the hologram, where the probe beam angle of incidence with respect to the reflective axis is equal to the diffracted beam angle of reflection with respect to the reflective axis. The k-space diagram 410-b has a positive sideband $\Delta n(\vec{k})$ k-space distribution 450-b that has an angle measured with respect to the z-axis, equal to that of the reflective axis 430-b of grating structure 405-b. The k-space diagram 410-b also has a negative sideband $\Delta n(\vec{k})$ k-space distribution 453-b that has an angle measured with respect to the z-axis, equal to that of the reflective axis 430-b. The k-sphere 440-b may represent visible blue light, visible green light, or visible red light. In some embodiments, the k-sphere may represent other wavelengths of electromagnetic radiation, including but not limited to ultraviolet or infrared wavelengths.

The k-space diagram 410-b depicts a case where the probe beam 435-b produces a diffracted beam k-space distribution 425-b, $E_d(\vec{k})$ that is point-like and lies on the probe beam 440-b k-sphere. The diffracted beam k-space distribution 425-b is produced according to the convolution of Equation (4).

The probe beam 435-b has a k-space distribution, $E_p(\vec{k})$, that is also point-like. In this case, the probe beam is said to be "Bragg-matched" to the hologram, and the hologram may produce significant diffraction, even though the probe beam wavelength differs from the wavelength of the recording beams used to record the hologram. The convolution operation may also be represented geometrically by the vector sum $\vec{k}_d = \vec{k}_p + \vec{K}_{G+}$, where $\vec{k}_d$ represents a diffracted beam wave vector 420-b, $\vec{k}_p$ represents a probe beam wave vector 415-b, and $\vec{K}_{G+}$ represents a positive sideband grating vector 451-b. Vector 445-b represents the sum of the probe beam wave vector 415-b and the positive sideband grating vector 451-b according to the convolution of Equation (4). The k-space diagram 410-b also has a negative sideband grating vector 452-b.

The probe beam wave vector 415-b and the diffracted beam wave vector 420-b may form the legs of a substantially isosceles triangle. The equal angles of this triangle may be congruent with the angle of incidence and angle of reflection, both measured with respect to the reflective axis 430-b. Thus, the grating structure 405-b may reflect light in a substantially mirror-like manner about the reflective axis 430-b.

Figure 5A:
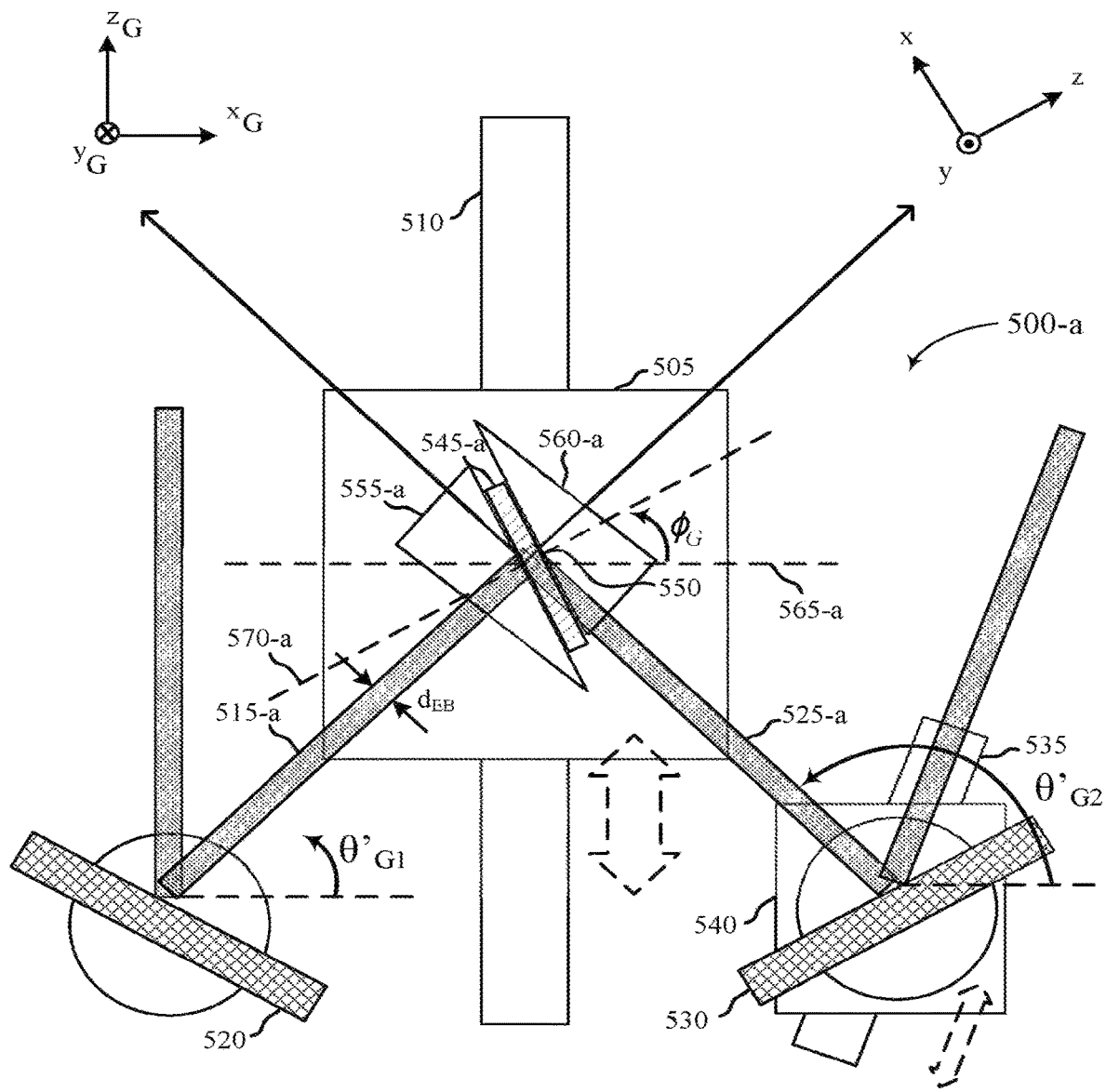
FIG. 5A illustrates a diagram of a system that can be used to manufacture a skew mirror for input and/or output coupling in accordance with various aspects of the present disclosure.

FIG. 5A is a system 500-a for manufacturing a skew mirror in accordance with various aspects of the present disclosure. Skew mirrors may be used with one or both of an input coupling element or an output coupling device with respect to various input coupling techniques described herein. System 500-a may include a sample stage carrier 505, a sample carrier rail 510, a first recording beam 515-a, a signal mirror 520, a second recording beam 525-a, a reference mirror 530, a reference mirror carrier rail 535, a reference mirror carrier 540, a grating medium 545-a, a hologram 550, a first prism 555-a, and a second prism 560-a.

System 500-a may include global coordinates (xG, yG, zG) and skew mirror coordinates (x, y, z). The origin may be defined to be in the center of the grating medium 545-a. In some cases, the grating medium 545-a may comprise a generally rectangular shape where 'z' corresponds to the thickness of the grating medium 545-a, 'x' corresponds to the length of the in-plane side of the grating medium 545-a, and 'y' corresponds to the length of the in-plane side of the grating medium 545-a. The global angle for recording, θG, may be defined as the angle of the first recording beam 515-a with respect to the xG-axis inside grating medium 545-a. Skew mirror coordinates (x, y, z) may be converted to global coordinates by the following equation:

$$\begin{bmatrix} x_G \\ y_G \\ z_G \end{bmatrix} = \begin{bmatrix} \sin\phi_G & 0 & \cos\phi_G \\ 0 & -1 & 0 \\ \cos\phi_G & 0 & -\sin\phi_G \end{bmatrix} \begin{bmatrix} x \\ y \\ z \end{bmatrix} \quad (5)$$

The system 500-a may be used to configure recording beams to have a size approximately equal to a desired eye box size. In an implementation, the system 500-a may dispose rotating mirrors such as the signal mirror 520 and the reference mirror 530 to create the correct angles for the first recording beam 515-a and the second recording beam 525-a. The angle of the signal mirror 520 may be changed to produce a desired angle (θG1) of first recording beam 515-a with width ~dEB. The sample stage carrier 505 and the reference mirror carrier 540 may be positioned so as to illuminate the correct location with the recording beams for each exposure. The sample stage carrier 505 of the system 500-a may be positioned on the sample carrier rail 510 to facilitate the illumination of the grating medium 545-a with the first recording beam 515-a in the desired location. The reference mirror carrier 540 may be positioned on the reference mirror carrier rail 535 to facilitate the illumination of the grating medium 545-a with the second recording beam 525-a in the desired location. The grating medium 545-a may be referred to as a recording medium prior to or during hologram recording, and may include a photopolymer. In some embodiments, the grating medium may comprise photorefractive crystals, dichromatic gelatin, photo-thermo-refractive glass, and/or film containing dispersed silver halide particles.

With the rotation of the signal mirror 520 and the reference mirror 530 set, the mirrors may be arranged to direct the first recording beam 515-a and the second recording beam 525-a such that the recording beams intersect and interfere with each other to form an interference pattern that is recorded as a hologram 550 in the grating medium 545-a. The hologram 550 may be an example of a grating structure. The system 500-a may form multiple grating structures, each configured to reflect light of a particular wavelength about the skew axis 565-a at a plurality of incidence angles. Each grating structure may be formed using a plurality of exposures of the grating medium 545-a to coherent light having a particular wavelength. The plurality of incidence angles corresponding to each grating structure may be offset from one another by a minimum range of angles.

In some implementations, the recording beams may have widths that differ from each other, or they may be the same.

The recording beams may each have the same intensity as each other, or intensity can differ among the beams. The intensity of the beams may be non-uniform. The grating medium 545-a is typically secured in place between the first prism 555-a and the second prism 560-a using a fluid index matched to both the prisms and the grating medium. A skew axis 565-a resides at a skew angle relative to the surface normal 570-a. As depicted in FIG. 5A, skew angle may be −30.25 degrees relative to the surface normal 570-a. The angle between the first and second recording beams may reside in a range from 0 to 180 degrees. The recorded skew angle relative to surface normal 570-a then becomes $\phi' = (\theta_{R1}+\theta_{R2}-180°)/2 + \theta_G$ for in-plane system 500-a. For the nominal case where $\theta_{G2}=180°-\theta_{G1}$, $\phi'=\phi_G$. In FIG. 5, $\phi_G$ shows the nominal skew angle relative to surface normal. Additionally, in FIG. 5, the exact depiction of angles of $\theta_{G1}$ and $\theta_{G2}$ are not shown. The angles of $\theta'_{G1}$ and $\theta'_{G2}$ are illustrated and correspond to the angles of $\theta_{G1}$ and $\theta_{G2}$. The angles of $\theta_{G1}$ and $\theta_{G2}$ are in relation to the first recording beam 515-a and the second recording beam 525-a beam, respectively, within the first prism 555-a and the second prism 560-a. The angles of $\theta'_{G1}$ and $\theta'_{G2}$ will be different from angles of $\theta_{G1}$ and $\theta_{G2}$ because of an index of refraction mismatch at the boundary between air and the prisms when the recording beams enter the prisms (e.g., the effects of Snell's Law or the law of refraction).

The first recording beam 515-a and the second recording beam 525-a may be nominally symmetrical about the skew axis 565-a such that the sum of first recording beam internal angle relative to the skew axis and the second recording beam internal angle relative to the skew axis equates to 180 degrees. Each of the first and second recording beams may be collimated plane wave beams originating from a laser light source.

Refraction at air/prism boundaries, for example where the first recording beam 515-a intersects an air/prism boundary of the first prism 555-a and where the second recording beam 525-a intersects an air/prism boundary of the second prism 560-a, is shown figuratively rather than strictly quantitatively. Refraction at the prism/grating medium boundary may also occur. In implementations, the grating medium and prisms each have an index of refraction of approximately 1.5471 at the recording beam wavelength of 405 nm.

A skew angle for a hologram (including a mean skew angle for a collection of holograms) can be substantially identical to a reflective axis angle, meaning the skew angle or mean skew angle is within 1.0 degree of the reflective axis angle. Given the benefit of the present disclosure, persons skilled in the art will recognize that the skew angle and reflective axis angle can be theoretically identical. However, due to limits in system precision and accuracy, shrinkage of recording medium that occurs during recording holograms, and other sources of error, the skew angle or mean skew angle as measured or estimated based on recording beam angles may not perfectly match the reflective axis angle as measured by incidence angles and reflection angles of light reflected by a skew mirror. Nevertheless, a skew angle determined based on recording beam angles can be within 1.0 degree of the reflective axis angle determined based on angles of incident light and its reflection, even where medium shrinkage and system imperfections contribute to errors in estimating skew angle and reflective axis angle. It is understood that these medium shrinkage and system imperfections can be made arbitrarily small in the manufacture of skew mirrors. In this regard, these medium shrinkage and system imperfections may be considered analogous to flatness of an ordinary or conventional mirror. In some examples, a fundamental limit associated with the manufacture of skew mirrors using volume holograms may be based on thickness of the recording medium.

A skew axis/reflective axis is generally called a skew axis when referring to making a skew mirror (for example when describing recording a hologram in a skew mirror grating medium), and as a reflective axis when referring to light reflective properties of a skew mirror. A skew angle for a hologram (including a mean skew angle for a collection of holograms) can be substantially identical to a reflective axis angle, meaning the skew angle or mean skew angle is within 1.0 degree of the reflective axis angle. Persons skilled in the art given the benefit of the present disclosure will recognize that the skew angle and reflective axis angle can be theoretically identical. However, due to limits in system precision and accuracy, shrinkage of recording medium that occurs during recording holograms, and other sources of error, the skew angle or mean skew angle as measured or estimated based on recording beam angles may not perfectly match the reflective axis angle as measured by incidence angles and reflection angles of light reflected by a skew mirror. Nevertheless, a skew angle determined based on recording beam angles can be within 1.0 degree of the reflective axis angle determined based on angles of incident light and its reflection, even where medium shrinkage and system imperfections contribute to errors in estimating skew angle and reflective axis angle. Given the benefit of the present disclosure, persons skilled in the art will recognize that the skew angle for a given hologram is the same as the grating vector angle for that hologram.

In a variation of the system 500-a, a variable wavelength laser may be used to vary the wavelength of the first and second recording beams. Incidence angles of the first and second recording beams may be, but are not necessarily, held constant while the wavelength of the first and second recording beams is changed. Wavelengths may be comprised of visible red light wavelength, visible blue light wavelength, visible green light wavelength, ultraviolet (UV) wavelength, and/or infrared (IR) wavelength. Each grating structure of the system 500-a may reflect an incidence angle at a wavelength that is different than another grating structure. The system 500-a may have reflective properties that allow it to reflect light at a substantially different wavelength, and in particular a considerably longer wavelength, than the recording beam wavelength.

Figure 5B:
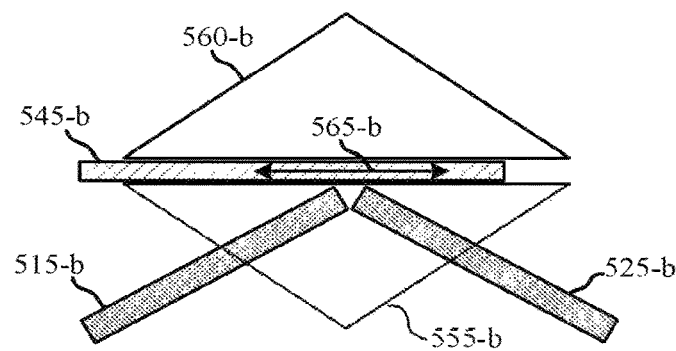
FIG. 5B illustrates a diagram of a system that can be used to manufacture a skew mirror for input and/or output coupling in accordance with various aspects of the present disclosure.

FIG. 5B is a system 500-b for manufacturing a skew mirror in accordance with various aspects of the present disclosure. Skew mirrors may be used with one or both of an input coupling element or an output coupling device with respect to various input coupling techniques described herein. System 500-b may include a first recording beam 515-b, a second recording beam 525-b, a grating medium 545-b, a first prism 555-b, a second prism 560-b, and skew axis 565-b. System 500-b may be an expanded view in reference to embodiments discussed in reference to FIG. 5A.

In some cases, one or more skew mirrors may be fabricated for a light coupling device used as a cross coupler. For example, each reflective axis may be either parallel or angularly offset to the surfaces of the one or more waveguides within the pupil expander. For example, a cross coupler having a crossed skew mirror cross coupler configuration may be fabricated by re-orienting the grating medium 545-b within the first prism 555-b and the second prism 560-b. In some recording implementations, the second prism 560-b may be omitted and replaced with a component for securing or stabilizing the grating medium 545-b. The component for securing or stabilizing the grating medium 545-*b* that may also include light absorbing characteristics. For example, the first recording beam 515-*b* and the second recording beam 525-*b* may both enter the first prism 555-*b* when configuring a cross coupler.

In some cases, a second skew mirror orientation may be recorded on the re-oriented grating medium 545-*b*. The second skew mirror may be oriented in an at least partially overlapping, or non-overlapping manner with the first skew mirror. Thus, a cross skewed mirror configuration is formed in a given volume of the grating medium 545-*b* (i.e., the recording medium after reorienting and curing processes). The re-orienting process may be repeated to record all desired skew axes of the light coupling device. In some cases, the second skew mirror may be oriented in a non-overlapping manner with the first skew mirror.

Figure 6:
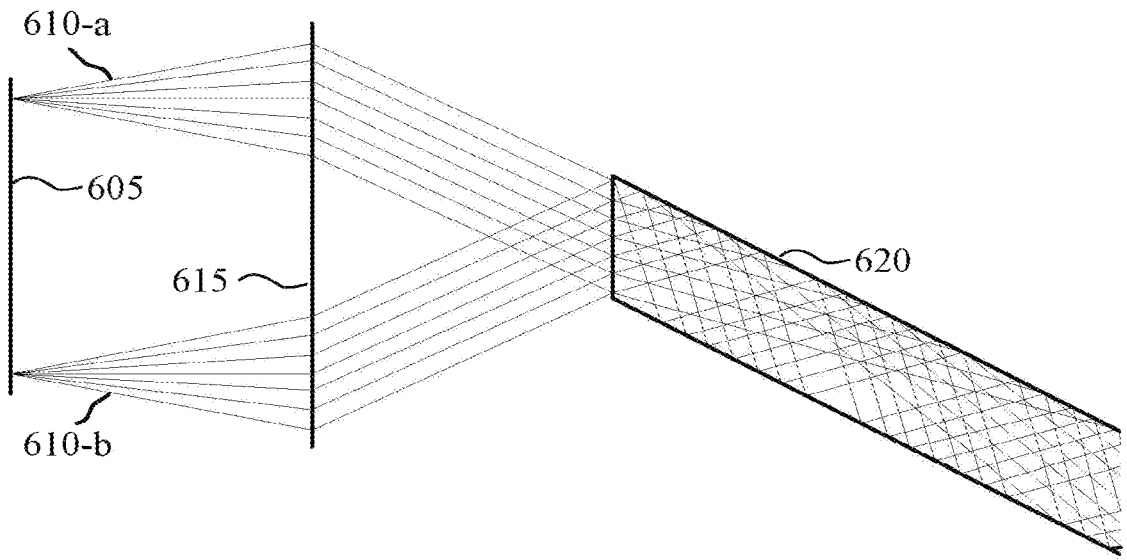
FIG. 6 illustrates an example of an optical device and system that supports edge-coupled input coupling techniques in accordance with various aspects of the present disclosure.

FIG. 6 illustrates an example of an optical device and system that supports edge-coupled input coupling techniques in accordance with various aspects of the present disclosure illustrates. Optical system 600 may be utilized in an application such as, but not limited to, an HMD device. In the example of FIG. 6, by edge coupling directly into the TIR waveguide, a pupil size used or formed by the projection optics may be increased or maximized for certain optical device applications. Accordingly, advantageous pupil replication results may be achieved for certain optical device applications.

Optical system 600 may include projection optics including a light source such as, but not limited to, an LCD display 605, and a projection coupling element such as, but not limited to a convex projection lens 615. For example, convex projection lens 615 may be disposed between and aid in defining an optical path from the LCD display 605 to waveguide 620. Other projection optics such a Fourier lens may be used as a projection coupling elements in certain applications.

A projection coupling element may be disposed a focal length away from a light source. Light rays from the light source may be afocal with respect to an entrance portion of the waveguide 620. That is, after passing through the projection coupling element, the light rays will not converge or diverge (i.e., be focused at infinity). One or more grating structures within a grating medium (not shown) of the waveguide 620 may interact with the light rays subject to a TIR range of internal incident angles. For examples, the grating structures may be configured as various optical coupling elements such as, but not limited to, a cross coupler or an output coupler. The first set of rays leaving the light source represents the highest field angles from one edge portion of the light source, and the second set of rays leaving the light source represents the highest field angles from another edge portion of the light source.

A first set of rays 610-*a* may correspond to an edge portion of the horizontal or vertical field of view for a rectangular image from LCD display 605. A second set of rays 610-*b* may correspond to an opposing edge of the horizontal or vertical field of view for the rectangular image. In some implementations, when a waveguide includes a cross coupler and an output coupler, the first set of rays 610-*a* may correspond to an edge portion of a vertical field of view, and the second set of rays 610-*b* may correspond to an opposing edge of the vertical field of view. In other implementations, when a waveguide includes an output coupler, the first set of rays 610-*a* may correspond to an edge portion of a horizontal field of view, and the second set of rays 610-*b* may correspond to an opposing edge of the horizontal field of view.

In some implementations, waveguide 620 may be a single media layer having a grating medium portion within the media layer. For example, the media layer may be formed from a media mixture that is sufficiently hardened to form parallel surfaces to guide TIR modes therein. A thin layer coating may be applied to the surface provide a protective layer for the media layer. In other implementations, waveguide 620 may be include one or more substrate layers and a media layer (not shown).

Figure 7:
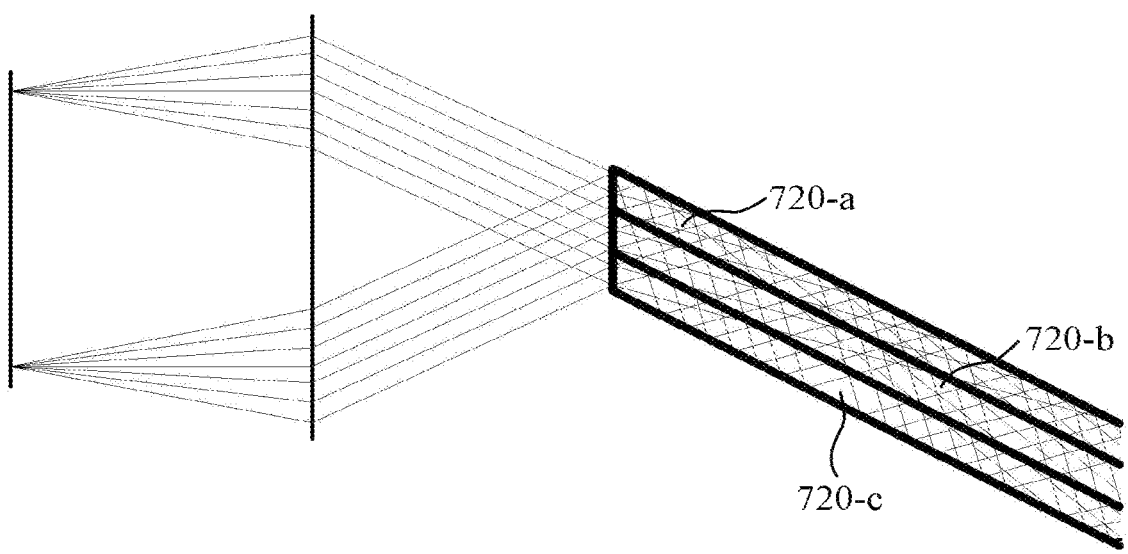
FIG. 7 illustrates an example of an optical device and system that supports edge-coupled input coupling techniques in accordance with various aspects of the present disclosure.

FIG. 7 illustrates an example of an optical device and system that supports edge-coupled input coupling techniques in accordance with various aspects of the present disclosure. Optical system 700 may be utilized in an application such as, but not limited to, an HMD device.

Optical system 700 may include similar projection optics and light rays as described with respect to FIG. 6. In the example of FIG. 7, waveguide layers include top substrate 720-*a*, media layer 720-*b* (e.g., grating medium), and bottom substrate 720-*c*. Top substrate 720-*a*, media layer 720-*b*, and bottom substrate 720-*c* are index matched with each other. That is, each of top substrate 720-*a*, media layer 720-*b*, and bottom substrate 720-*c* has an index of refraction that is matched with the operable wavelengths of light.

In some implementations, top substrate 720-*a*, media layer 720-*b*, and bottom substrate 720-*c* may be considered index matched when their indices of refraction are approximately within 0.01 of each other for a narrowband spectrum of electromagnetic wavelengths (e.g., wavelengths within one color in the spectrum of visible light or a narrowband wavelengths outside of the spectrum of visible light such as infrared wavelengths). In other implementations, top substrate 720-*a*, media layer 720-*b*, and bottom substrate 720-*c* may be considered index matched when their indices of refraction are approximately within 0.001 of each other for wavelengths within the spectrum of visible light (e.g., at least two colors in the spectrum of visible light wavelengths).

Each of the waveguide layers in optical system 700 may be configured to operate as parallel plates. Image degradation can occur when light is edge coupled to two or more layers where each layer is not index matched and not configured to operate as parallel plates within the waveguide.

Additionally, in the example of FIG. 7, a glass-holographic media-glass package may be polished at the appropriate angle for receiving in-coupled image light. A consistency of media layer 720-*b* may directly impact an ability to polish the edge. Method for achieving optical quality polish include, but are not limited to, harden media layer 720-*b* proximal to an input coupling face. Media layer hardening processes may include applying additional chemical reactions that are triggered optically or chemically. The media layer hardening processes may be applied after a plurality of volume holograms have been written in the media layer 720-*b* (e.g., forming a grating medium with holographic grating structures therein). Additionally or alternatively, media layer hardening processes may include electron-beam hardening techniques, soaking an exposed media edge of media layer 720-*b* in chemical compounds to initiate a chemical hardening process. After completion of one or more media layer hardening processes, media layer 720-*b* proximal to an input coupling face (as well as top substrate 720-*a* and bottom substrate 720-*c*) may be polished to an optical finish.

FIG. 8 illustrates an example of an optical device and system that supports edge-coupled input coupling techniques in accordance with various aspects of the present disclosure. Optical system 800 may be utilized in an application such as, but not limited to, an HMD device.

Optical system 800 may include similar projection optics and light rays as described with respect to FIG. 6. Optical system 800 may also include similar waveguide layer characteristics and utilize similar media layer hardening and polishing processes described with respect to FIG. 7.

In the example of FIG. 8, waveguide 820 may include an input coupling window 830 to protect the grating medium from environment. In some examples, the grating medium may include a semi-volatile component that when exposed to environment may reduce the efficacy of the grating structures therein. Additionally, input coupling window 830 may be more amenable polishing or other treatment to for creating a better edge by which light may enter waveguide 820. For image light entering waveguide 820 via an input coupling face, input coupling window 830 may act as a parallel plate element. Input coupling window 830 may be a non-diffractive optical element.

Coupling input coupling window 830 may be desirable option if the media material in the media layer is nor amenable to polishing or pre-treated processes necessary for optical coupling. Methods for coupling input coupling window 830 include, but are not limited to, adhering input coupling window 830 to the edge of waveguide 820 with an optical adhesive. The optical adhesive may be the media used in the holographic waveguide or may be UV, thermal-set, or pressure sensitive adhesive suitable for optical bonding. Additionally or alternatively, adhering input coupling window 830 may be deposited or coated over an edge of waveguide 820.

FIG. 9 illustrates an example of an optical device and system that supports edge-coupled input coupling techniques in accordance with various aspects of the present disclosure. Optical system 900 may be utilized in an application such as, but not limited to, an HMD device.

Optical system 900 may include similar projection optics and light rays as described with respect to FIG. 6. Optical system 900 may include similar waveguide layer characteristics and utilize similar media layer hardening and polishing processes described with respect to FIG. 7. Optical system 900 may also include similar optical element adhesion processes described with respect to FIG. 8.

In the example of FIG. 9, waveguide 920 may include a prism 930 coupled to an edge of waveguide 920. In some applications, this approach may be desirable because edge preparation (e.g., creating a 90° edge) for waveguide 920 may be simplified over an angled preparation. Methods for coupling prism 930 include, but are not limited to, adhering prism 930 using conventional optical adhesive and filling holographic polymer or a gap-filling optical adhesive into potential void. Additionally or alternatively, prism 930 may be adhered using conventional optical contacting methods and backfilling polymer. Once polymer waveguide has been fabricated (e.g., either before or after exposure to programming beams) prism 930 may cast in place. Prism 930 may be index matched to the media layer. Prism 930 may be a non-diffractive optical element. Prism 930 may be capable of engaging and obviating any irregularities that may exist in the waveguide layers of waveguide 920.

Figure 10:
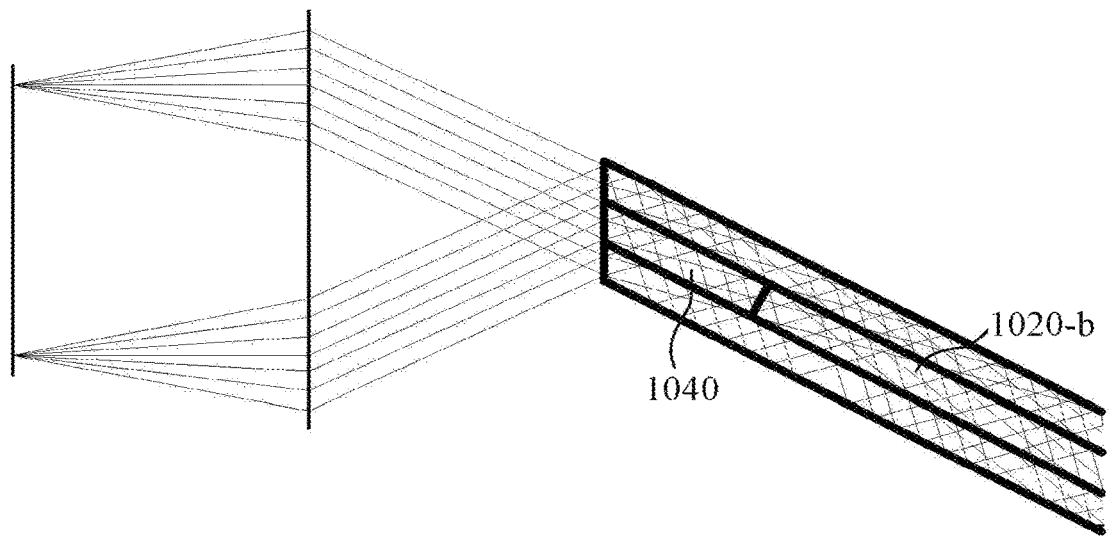
FIG. 10 illustrates an example of an optical device and system that supports edge-coupled input coupling techniques in accordance with various aspects of the present disclosure.

FIG. 10 illustrates an example of an optical device and system that supports edge-coupled input coupling techniques in accordance with various aspects of the present disclosure. Optical system 1000 may be utilized in an application such as, but not limited to, an HMD device.

Optical system 1000 may include similar projection optics and light rays as described with respect to FIG. 6. Optical system 1000 may include similar waveguide layer characteristics and utilize similar media layer hardening and polishing processes described with respect to FIG. 7. Optical system 1000 may also include similar optical element adhesion processes described with respect to FIGS. 8 and 9.

Media layer 1020-*b* may be a middle layer that includes one or more substrate sections 1040 (e.g., glass substrate sections) and media sections for constructing a waveguide 1020 with an edge having a same material (e.g., an all-glass substrate edge) that can be polished to a near-ideal input edge. In some applications, this approach may be desirable because angled edge preparation of an homogenous material edge of waveguide 1020 (e.g., top substrate end portion, substrate section 1040, and bottom substrate edge portion are all comprised of the same material with the same index of refraction) may be simplified over an angled preparation of an inhomogeneous material edge. The homogenous material edge of waveguide 1020 can be polished to an appropriate angle for a particular application of waveguide 1020.

In some examples, optical recording cells may be created with the middle spacer layer before injecting photopolymer. In some cases, this process may be performed in an array of optical recording cells or in singular forms of a media package. Empty cells optical recording can have spacer perimeters consisting of glass or spacer-ball/adhesive combinations. If spacer cells are in grid form, they are designed in such a way as to allow for filling all of the cells with only a few access ports. Example fabrication techniques are described with respect to FIGS. 12A-12C.

Figure 11:
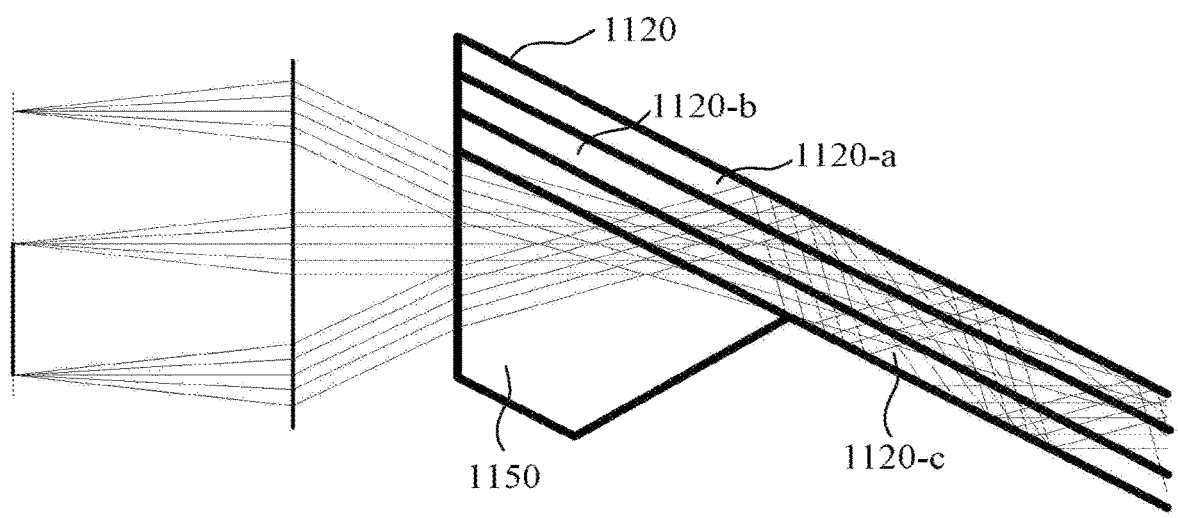
FIG. 11 illustrates an example of an optical device and system that supports surface-coupled input coupling techniques in accordance with various aspects of the present disclosure.

FIG. 11 illustrates an example of an optical device and system that supports surface-coupled input coupling techniques in accordance with various aspects of the present disclosure. Optical system 1100 may be utilized in an application such as, but not limited to, an HMD device.

Optical system 1100 may include similar projection optics and light rays as described with respect to FIG. 6. Optical system 1100 may include similar waveguide layer characteristics and utilize similar media layer hardening and polishing processes described with respect to FIG. 7. Optical system 1100 may also include similar optical element adhesion processes described with respect to FIGS. 8-10.

In the example of FIG. 11, waveguide 1120 may include a prism 1150 coupled to a surface of waveguide 1120. The surface to which prism 1150 is coupled (e.g., adhered to, bonded to, or integrate with in some implementations) is a portion of a TIR surface of waveguide 1120. In this approach, edge preparation of the waveguide 1120 and media layer 1120-*b* may be omitted. A smaller entrance pupil may result in a surface-coupled input coupling application. A size of an input coupling face may generally correspond to a size of an entrance pupil that can enter a waveguide. In some examples, a prism will extend to a point distal the surface of the waveguide different from prism 1150 shown as truncated in the example of FIG. 11.

In some examples, this approach may be desirable because the in-coupled image light is input coupled to waveguide 1120 via an optical path that initially traverses a single internal layer boundary between media layer 1120-*b* and bottom substrate 1120-*c*. It is understood that the 'bottom' designation of the bottom substrate 1120-*c* is not significant with respect to the single internal layer boundary. Rather, the designation 'bottom' is in reference to the particular orientation of waveguide 1120 in optical system 1100. The feature of traversing a single internal layer boundary can be met by directing light across any internal layer boundary between waveguide layers (e.g., a substrate layer and a media layer) in a TIR waveguide. Benefits of traversing a single internal layer boundary may be realized when the two waveguide layers have differing indices of refraction.

Figure 12A:
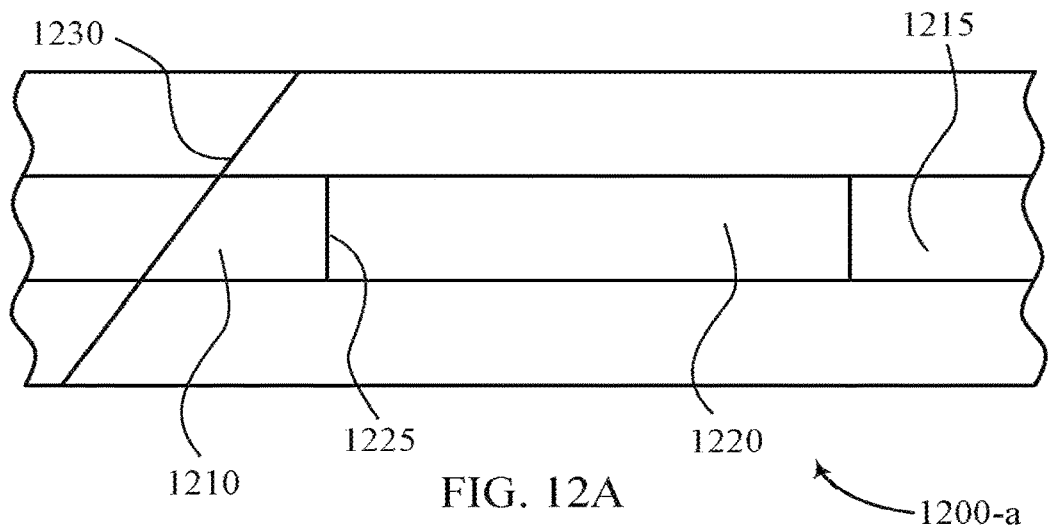
FIGS. 12A-12C illustrate an example method of fabricating an optical device that supports edge-coupled input coupling techniques in accordance with various aspects of the present disclosure.
Figure 12B:
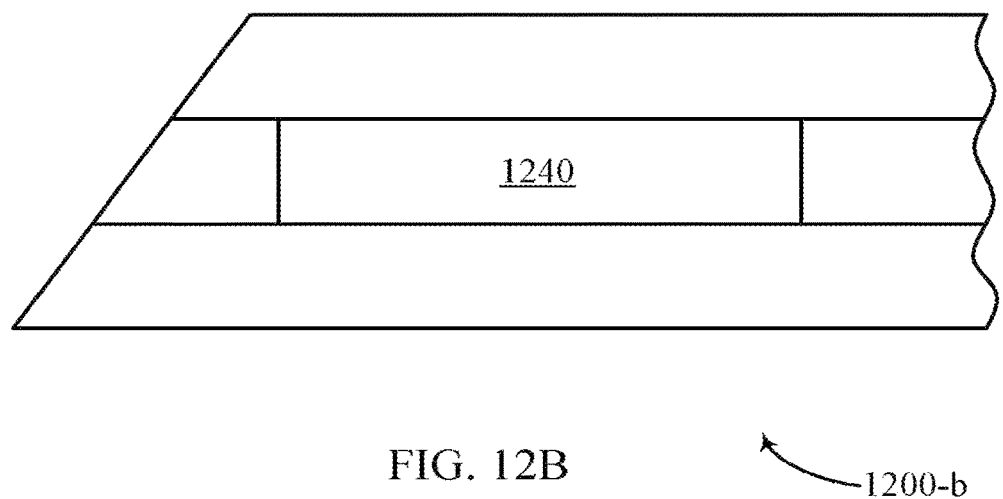
Figure 12C:
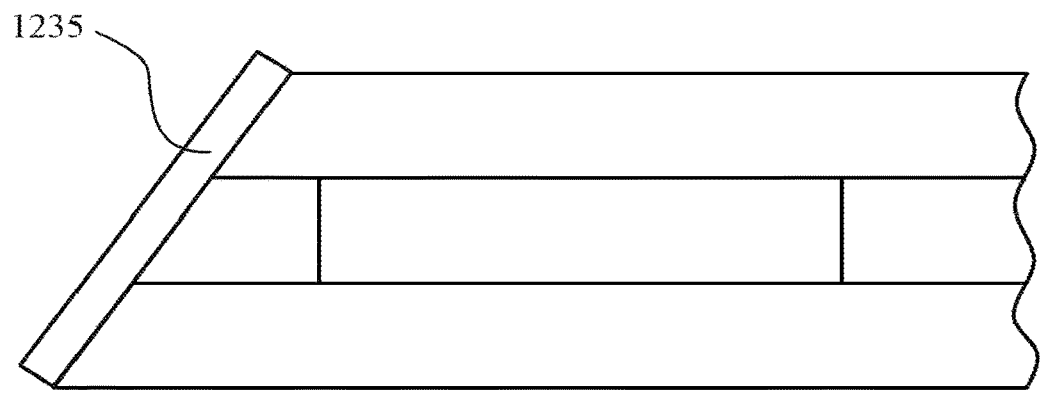

FIG. 12A-12C illustrate an example method of fabricating an optical device that supports edge-coupled input coupling techniques in accordance with various aspects of the present disclosure. With reference to FIG. 12A, a number of shims 1210, 1215, and 1220 may be placed along the length and/or at an end of optical recording cell 1200 between substrates 1205, as a means to at least provide structural support to the optical recording cell 1200. Each of shims 1210, 1215, and 1220 may have polished edges (e.g., edge 1225) and contain glass or polymer materials. Each of substrates 1205 may contain "LCD grade" glass. In some cases, polished edge 1225 may be coated with an absorptive coating, as a means to at least impede light from entering the side of the holographic media (e.g., medium mixture). An absorptive coating may be beneficial in cases where the holographic media is not adequately index matched to the refractive index of the encapsulating substrates 1205. A leading edge 1230 may then be cut at an angular offset.

In FIG. 12B, optical recording cell 1200 may be filled with the medium mixture 1240 via a port associated with a gap inherent to the orientation of shims 1210, 1215, and 1220 adhered to substrates 1205. Each of the shims 1210, 1215, and 1220 may then be sealed, and a recording medium formed from, in some cases, the recording medium may be photosensitive after formation of the matrix polymer but prior to exposure to photoinitiating light. Leading edge 1230 may be polished to form an edge for input coupling of optical recording cell 1200. The edge couple may be employed at optical recording cell 1200 as an entrance pupil for a waveguide configuration of optical recording cell 1200. In FIG. 12C, a cover slip 1235 may be placed in alignment with the cut edge 1230 and may span at least the port and the cut region of substrates. Cover slip 1235 may be index matched and adhered to the beveled edge 1230. In some example, optical recording cell 1200 may be used in applications such as optical system 1000 described in FIG. 10.

Figure 13:
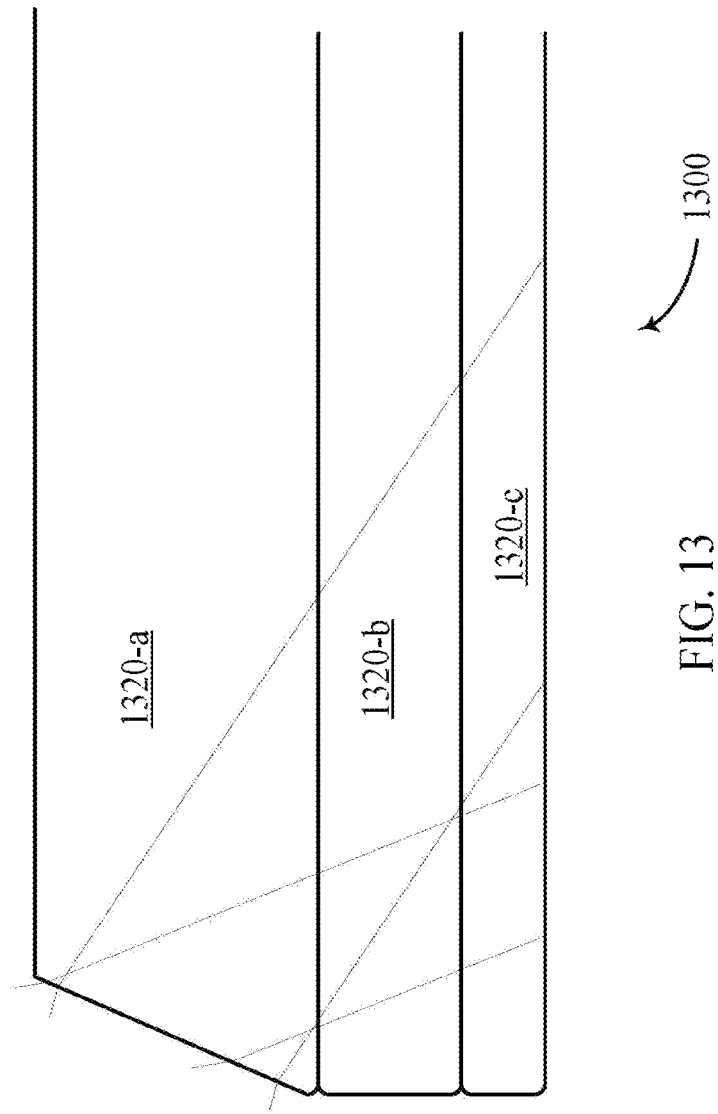
FIG. 13 illustrates an example of an optical device that supports edge-coupled input coupling techniques in accordance with various aspects of the present disclosure.

FIG. 13 illustrates an example of an optical device that supports edge-coupled input coupling techniques in accordance with various aspects of the present disclosure. In some examples, it may be advantageous to couple all rays entering waveguide 1300 through a single internal boundary, such as a boundary between substrate layer 1320-*a* and media layer 1320-*b*. Such an arrangement may provide, for example, more tolerance to index mismatch between the media layer 1320-*b* and substrate layers 1320-*a*, 1320-*c*. In some examples, coupling may be performed through an external surface of a substrate layer and an internal boundary between a substrate surface and media. Input coupling may be performed through an external edge of substrate layer 1320-*a* and an internal boundary between a substrate surface of substrate layer 1320-*a* and media layer 1320-*b*.

Figure 14A:
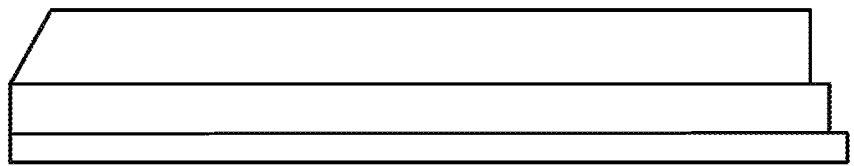
FIGS. 14A-14C illustrate examples of optical devices that support edge-coupled input coupling techniques in accordance with various aspects of the present disclosure.
Figure 14B:
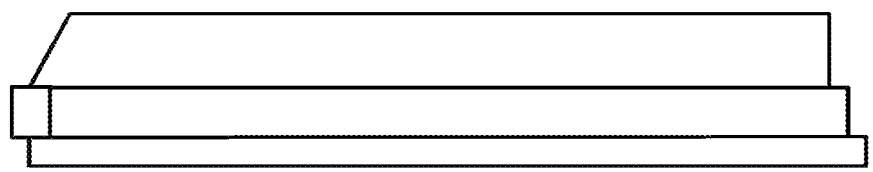
Figure 14C:
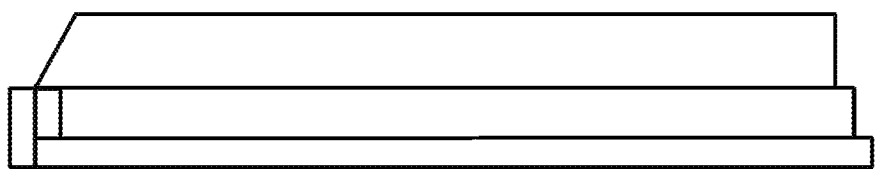

FIGS. 14A-14C illustrate examples of optical devices that support edge-coupled input coupling techniques in accordance with various aspects of the present disclosure. Waveguides 1400-*a*, 1400-*b*, 1400-*c* are illustrated having a thicker coupling substrate (e.g., a top substrate) in order to provide a larger coupling facet. In some examples, the coupling substrate may be the same thickness or thinner than an opposing non-coupling substrate. In some examples, the coupling substrate may be thicker than a media layer of a waveguide In other examples, both substrates may be used for coupling. In some examples, the media layer of waveguides 1400-*b*, 1400-*c* may be sealed.

Figure 15:
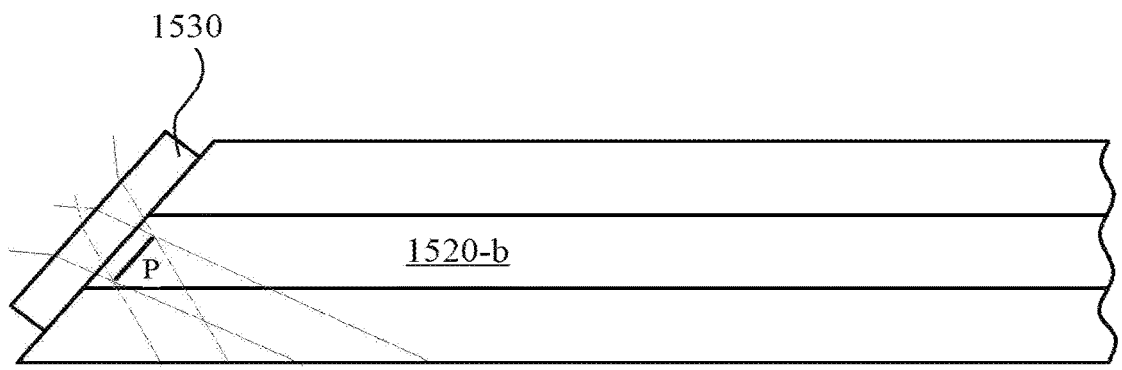
FIG. 15 illustrates an example of an optical device that supports edge-coupled input coupling techniques in accordance with various aspects of the present disclosure.

FIG. 15 illustrates an example of an optical device that supports edge-coupled input coupling techniques in accordance with various aspects of the present disclosure. In some embodiments, it may be advantageous to couple all rays through a single internal boundary, such as a boundary between an edge of the media layer 1520-*b* and an adhered window 1530. In some cases, the single internal boundary may be internal to the optical device (e.g., the waveguide and optical element coupled to the waveguide) and in other cases the single internal boundary may be internal to just the waveguide of an optical device.

Optical filtering may be employed to suppress rays that miss a virtual aperture, P, and might otherwise enter the media layer through a surface.

Figure 16:
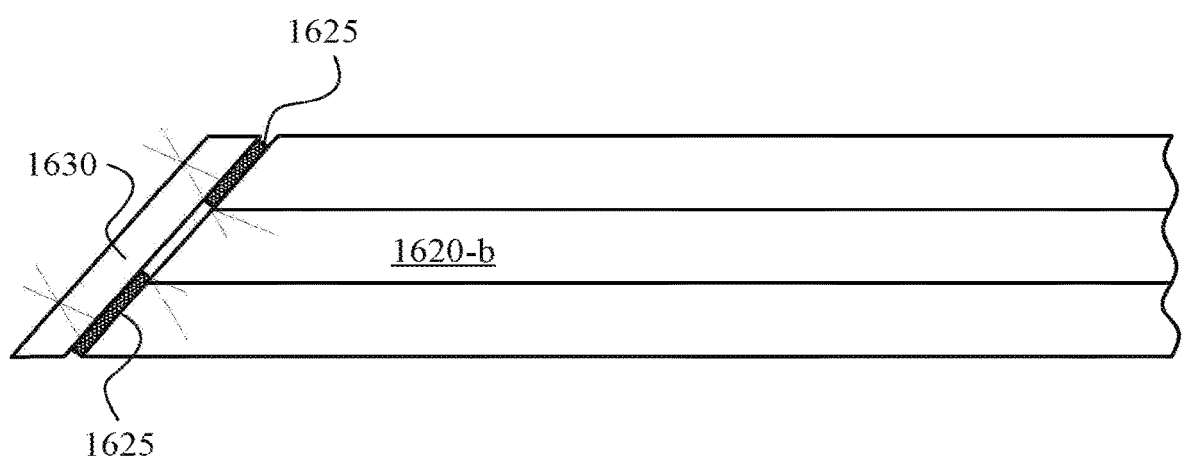
FIG. 16 illustrates an example of an optical device that supports edge-coupled input coupling techniques in accordance with various aspects of the present disclosure.

FIG. 16 illustrates an example of an optical device that supports edge-coupled input coupling techniques in accordance with various aspects of the present disclosure. Internal apertures may facilitate input coupling for optical device 1600. Internal boundary edge coupling may be facilitated by blocking unwanted rays at an internal aperture rather than by external means. In the example of FIG. 16, an internal aperture may be inserted at internal edge of a media layer 1620-*b*. An internal aperture may alternatively be formed by one or more light barrier elements 1625, for example, by treating or coating the substrate edges or the surface of the adhered window 1630. In some embodiments, an internal aperture may serve to form a deeper, smaller pupil from a larger shallower pupil.

In other examples, an internal aperture may be configured to block rays into the edge of the media layer and pass rays into the edge of one or more substrates (i.e., an inverse of the example in FIG. 16). This implementation may result in internal boundary surface coupling instead of internal boundary edge coupling.

Figure 17:
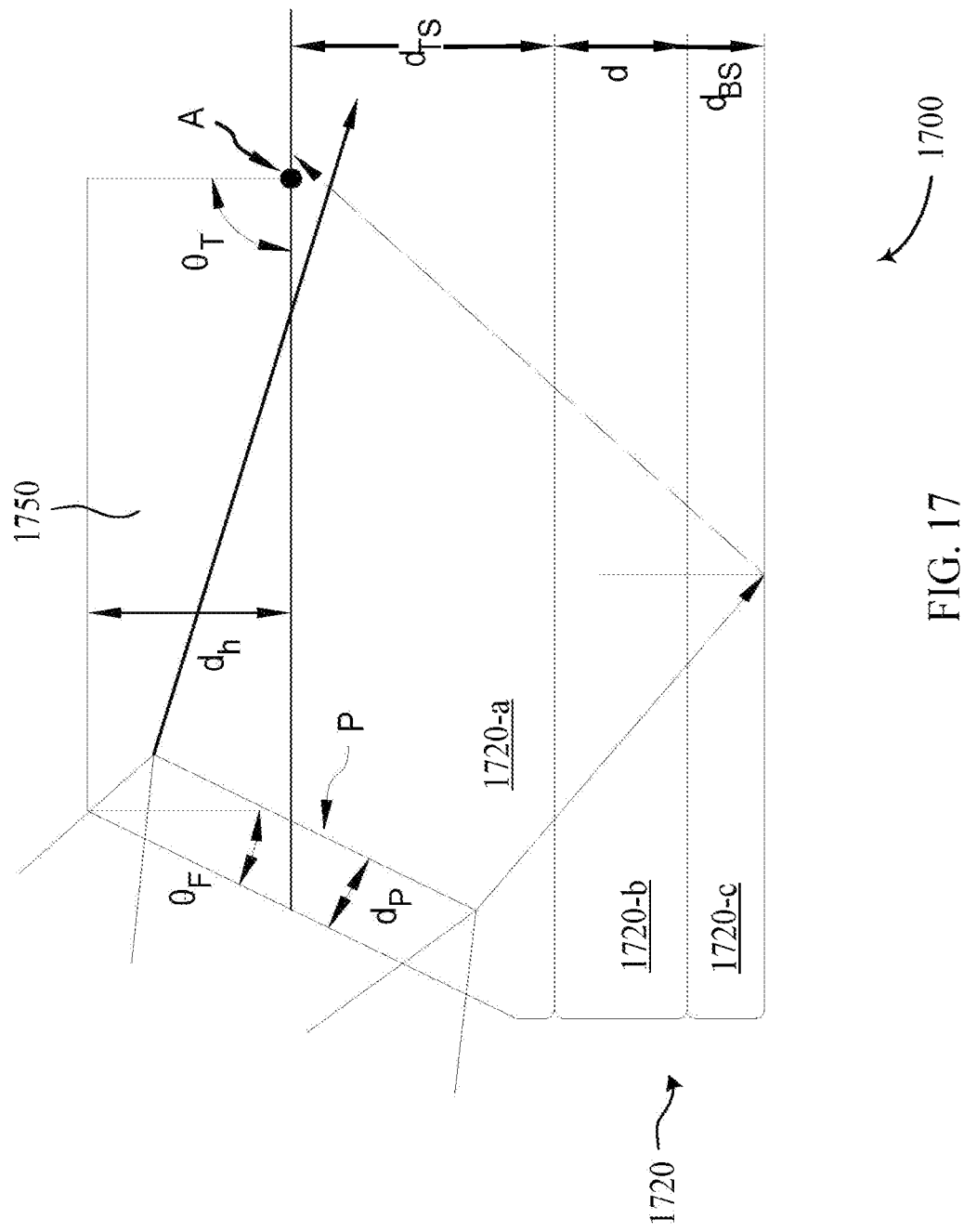
FIG. 17 illustrates an example of an optical device that supports edge-coupled input coupling techniques in accordance with various aspects of the present disclosure.

FIG. 17 illustrates an example of an optical device that supports edge-coupled input coupling techniques in accordance with various aspects of the present disclosure. Optical device 1700 illustrates split facet coupling techniques. In some examples, edge coupling may be performed through an edge facet comprised of both an edge of substrate layer 1720-*a* and an adhered prism 1750. A split facet may be able to produce guided modes filling a larger fraction of the waveguide thickness than examples where light is coupled into only substrate layer. The example of FIG. 17, however still provides internal boundary surface coupling. That is, in-coupled image light may be input coupled to waveguide 1720 via an optical path that initially traverses a single internal layer boundary between top substrate 1720-*a* and media layer 1720-*b*. A split facet may be polished or re-polished after adhesion of the prism in order to provide a very uniform, flat facet, or a uniform facet of another shape.

An adhesive process may be chosen to produce a very nearly invisible seam, such as a hard index-matched adhesive in a very thin layer. Prism 1750 and top substrate 1720-*a* may be the same material or well index-matched in order to eliminate or reduce Snell refraction at the prism-substrate boundary, which is not an internal waveguide boundary. In some implementations, a cover slip may be adhered to the split facet. Surfaces not involved in refraction or reflection, such as the top and right side of the prism 1750 may be treated or coated with an absorbent material in order to reduce stray light. In some examples, a portion of the input facet itself may be so treated in order to provide an aperture.

In some examples, a split facet may be used for input coupling. In other examples, a split facet may be used for output or both. In some examples, a substrate layer structure incorporating a prism may be prefabricated from a uniform material (e.g., BK-7 glass) without requiring the use of an adhesive. In some examples, a well-defined pupil may be formed by external projection optics (not shown). FIG. 17 illustrates such a pupil, marked "P." A pupil may be formed at a desired depth, $d_p$, with respect to the input facet (e.g., projection optics may be configured to direct image light to form an entrance pupil beyond an input coupling face comprising both prism 1750 and the edge of top substrate 1720-a and within the prism 1750 and the edge of top substrate 1720-a).

In some examples, a deeper pupil implementation (large $d_p$) may be configured to maximize the fraction of the waveguide thickness filled by the guided modes. In other examples, a shallower pupil implementation ($d_p$ small, $d_p=0$, or even $d_p<0$) may be configured to minimized the size and complexity of external projection optics. A deeper pupil may require a longer projector working distance than does a shallower pupil. Other factors equal, a longer working distance may require larger and/or more complex projection optics and optical elements than smaller working distance.

The example of FIG. 17 also illustrates the limiting rays for a relatively shallow pupil P, $ray_T$ (corresponding to the near edge of the field of view), and $ray_B$ (corresponding to the far edge of the field of view). Both rays are generally required to clear point A in order to be captured into the waveguide. Given the benefit of the present disclosure, geometric conditions may be analyzed for determining how to optimize pupil depth, pupil size, and other parameters.

Figure 18:
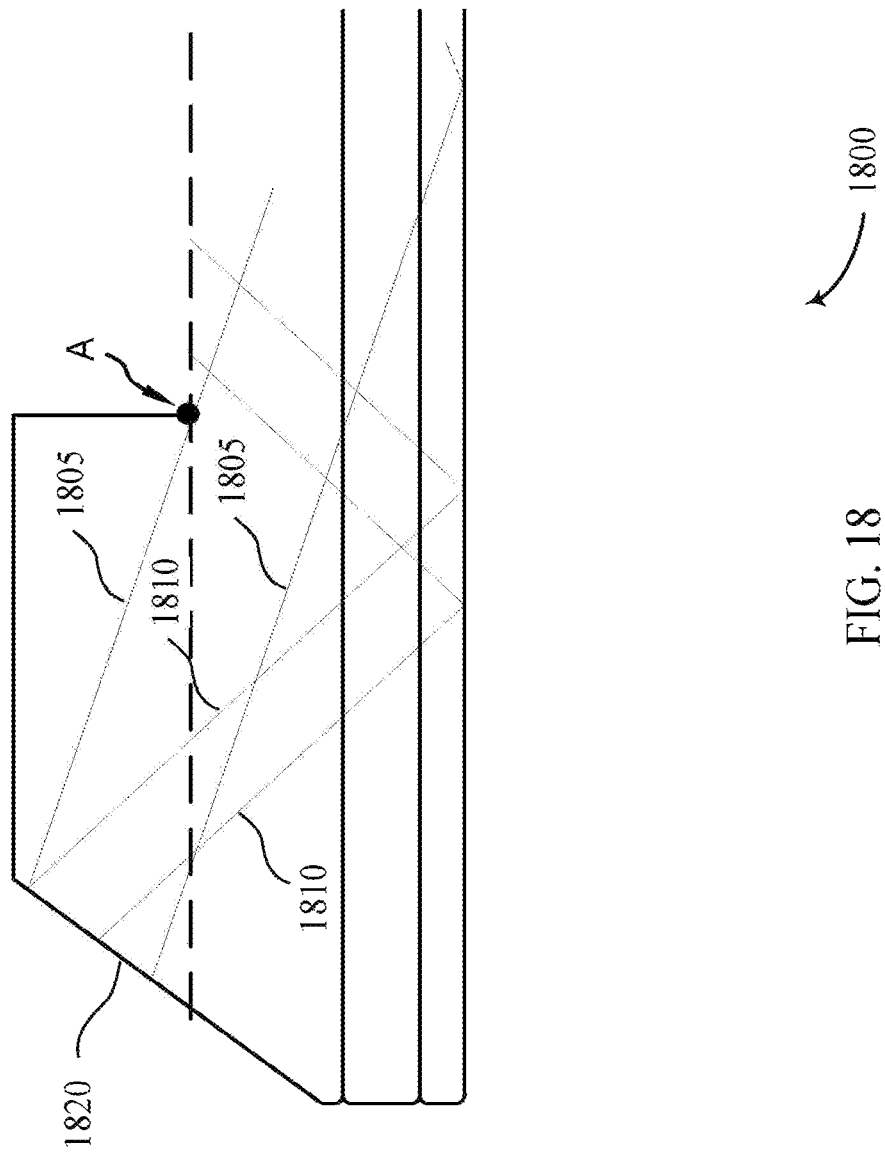
FIG. 18 illustrates an example of an optical device that supports edge-coupled input coupling techniques in accordance with various aspects of the present disclosure.

FIG. 18 illustrates an example of an optical device that supports edge-coupled input coupling techniques in accordance with various aspects of the present disclosure. In some examples, external projection optics (not show) may not create a well-defined pupil in waveguide 1800. Such cases may be analyzed as a superposition of independent collimated angular guided modes, each satisfying the geometric constraint. In the example of FIG. 18, a wide mode corresponding to the near edge of the field shown as solid ray lines 1805, and a narrow mode corresponding to the far edge of the field shown as dashed rays lines 1810 are illustrated. Such a situation may advantageously create a larger replicated pupil at the near edge of the field where the replication period is larger (i.e., worst case), while allowing a smaller replicated pupil at the far edge of the field where the replication period is smaller (i.e., best case). In other examples, collimated angular modes may be transmitted through the input facet 1820 that may include rays that do not clear point A. In such cases, a blocking means, such as an absorptive treatment or coating on the top and right edges of the prism, may be employed to prevent these rays from producing scatter that couples into the waveguide 1800.

Figure 19:
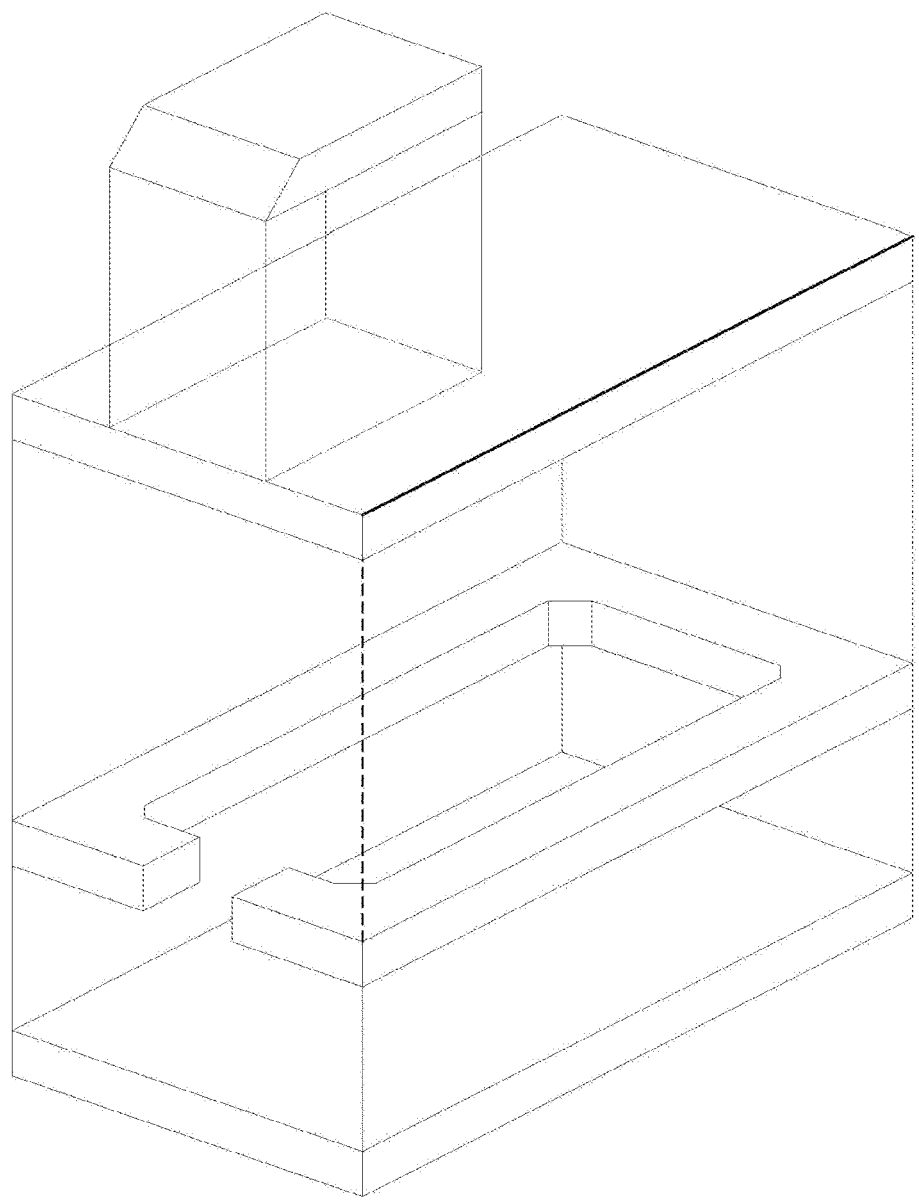
FIG. 19 illustrate an example method of fabricating an optical device that supports edge-coupled input coupling techniques in accordance with various aspects of the present disclosure.

FIG. 19 illustrate an example method of fabricating an optical device that supports edge-coupled input coupling techniques in accordance with various aspects of the present disclosure. In the example of FIG. 19, split facet assembly 1900 may include a plurality of waveguide layers. A split facet may overlap a gap in a spacer layer, advantageously allowing maximum clearance for rays coupled into the facet. The gap may serve as a media fill port. The gap may be sealed externally.

Figure 20A:
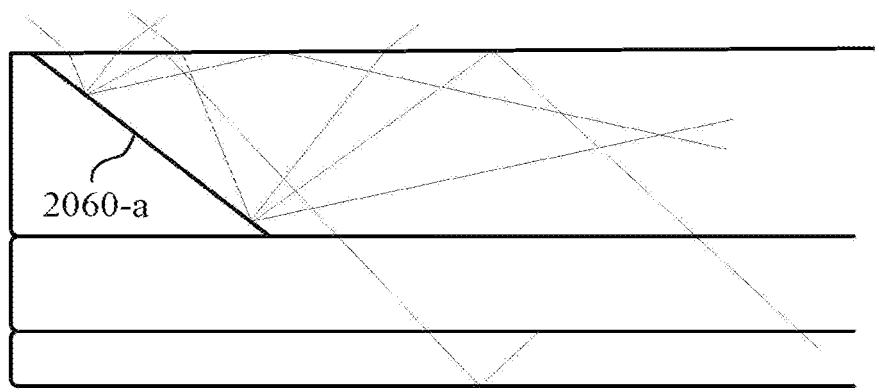
FIGS. 20A-20C illustrate examples of optical devices that support input coupling techniques in accordance with various aspects of the present disclosure.
Figure 20B:
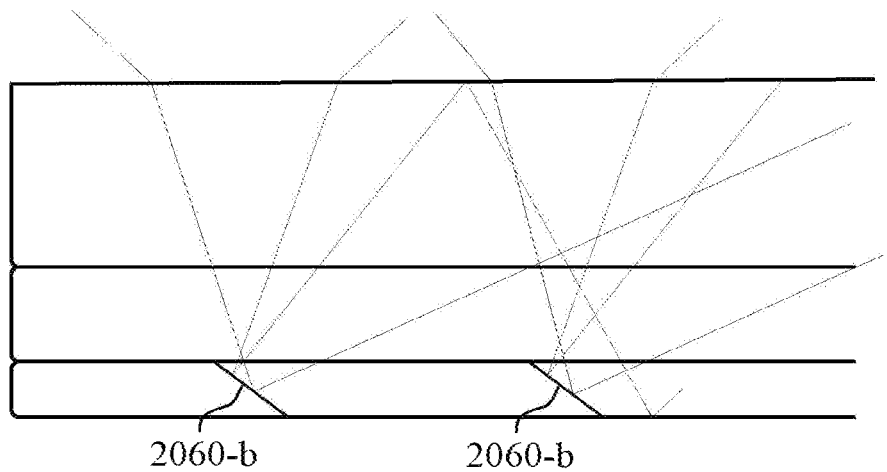
Figure 20C:
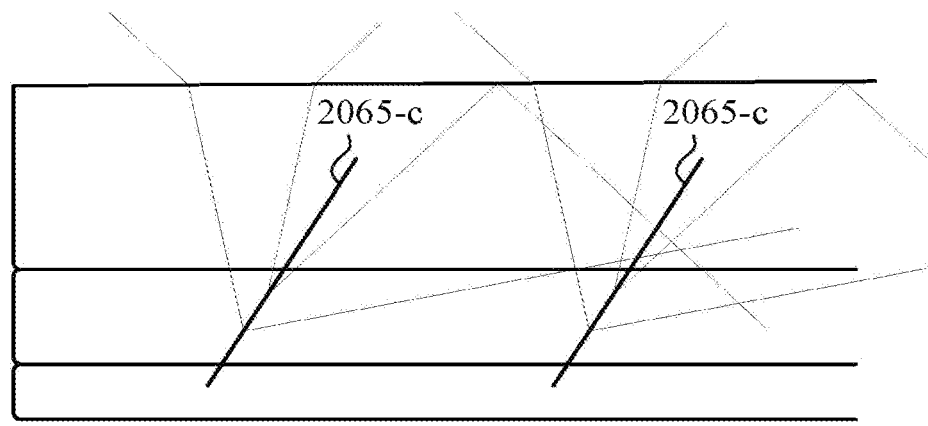

FIGS. 20A-20C illustrate examples of optical devices that support input coupling techniques in accordance with various aspects of the present disclosure. In the examples of FIGS. 20A and 20B, one or more internal reflective surfaces 2060-a, 2060-b may be used to facilitate coupling. Internal reflective surfaces 2060-a, 2060-b may employ a metallic layer(s), dielectric layer(s), or other techniques to produce reflection. Internal reflective surfaces 2060-a, 2060-b may be partially or fully reflective. Internal reflective surfaces 2060-a, 2060-b may be used to facilitate internal boundary surface or edge coupling, either through an external edge, and external surface such as a substrate surface, or both. Examples of internal reflective surfaces 2060-a, 2060-b facilitating external surface-to-internal boundary surface coupling are illustrated. In the example of FIG. 20A, a single internal reflective surface 2060-a is employed in a top substrate. In the example of FIG. 20B, multiple internal reflective surfaces 2060-b are employed in a bottom substrate in a "louvered" arrangement. In both cases, rays will generally be once-reflected by internal reflective surfaces 2060-a, 2060-b.

In some implementations, absorptive coatings or other techniques may be employed to reduce scattering such as, but not limited to, proximal to the backs of the louvers or the bottom of the package. In some examples, one or more internal reflective surfaces 2060-a, 2060-b may be incorporated into any combination of a top substrate, a bottom substrate, a media layer, or an externally-adhered optic such as a prism. In some examples, an internal reflective surface 2060-a, 2060-b may span two or more of these waveguide layers.

In the example of FIG. 20C, a media layer may be programmed or written with a diffractive pattern, such as a skew mirror having a reflective axis 2065-c, in order to perform input coupling. FIG. 20C illustrates an example of a skew mirror that is used for external surface-to-internal boundary surface coupling. Various skew mirror techniques and characteristics may be applied to an input coupler skew mirror as described herein.

FIG. 21 illustrates an example of an optical device that supports edge-coupled input coupling techniques in accordance with various aspects of the present disclosure. In some examples, an adhered prism configuration 2100 may facilitate homogenization of collimated guided modes. A guided mode may be said to be homogenous if no gap exists between replicated copies of the pupil corresponding to the mode. If gaps exist, the mode may be said to be inhomogeneous to some degree. The example of FIG. 21 illustrates how the highest mode angle that can be fully homogenized may be determined from the pupil size and waveguide thickness. In some examples, the highest practical mode angle may be smaller than this geometric limit.

The example of FIG. 21 also illustrates how all in-coupled light must generally pass through a virtual aperture formed by the trailing prism corner and its reflection in the waveguide floor. The first replicated pupil copy on a surface of waveguide 2105 is thus formed as the light that makes it through this aperture passes through the prism floor into waveguide 2105. In some embodiments it may be advantageous to apply an absorptive coating 2125 or the like to prevent light blocked by the aperture from becoming stray light. In some cases, prism coupler homogenization may be improved by employing a split facet coupling as described herein.

FIG. 22 illustrates an example of edge-coupled input coupling techniques in accordance with various aspects of the present disclosure. Example homogenization calculations are provided for edge coupling configuration 2200. An adhered prism coupler may require a large prism, and hence large projector optics, in order to fully homogenize the high mode angles required for a large field of view. For example, a design for a 60° diagonal field of view may require a maximum internal mode angle of $\theta_{max}=76°$, which in turn may require a prism of size P=12 mm to achieve full homogenization in a d=1.5 mm thick waveguide. In some examples, smaller optics may in-couple inhomogeneous guided modes which are further homogenized by other homogenization techniques. For example, partially reflective elements may be disposed between the waveguide surfaces. In some examples, homogenization techniques may alternatively or additionally be performed using a homogenizing surface input coupler.

Figure 23:
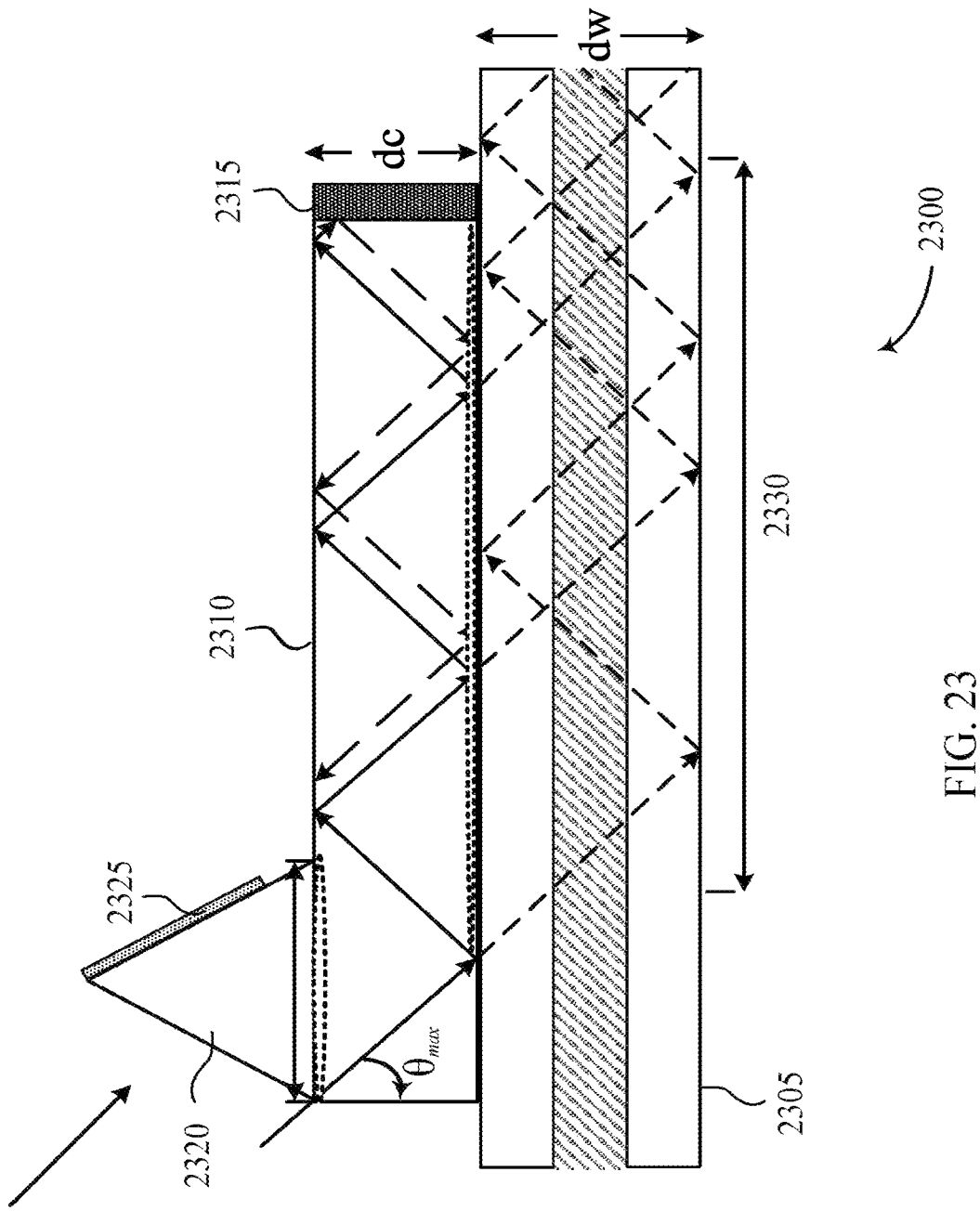
FIG. 23 illustrates an example of an optical device that supports surface-coupled input coupling techniques in accordance with various aspects of the present disclosure.

FIG. 23 illustrates an example of an optical device that supports surface-coupled input coupling techniques in accordance with various aspects of the present disclosure. In a homogenizing surface input coupling example, optical device 2300 may include a coupler duct 2310 that is couple to (e.g., adhered to) a surface of primary waveguide 2305. A boundary between the primary waveguide 2305 and coupler duct 2310 may be made partially reflective (e.g., a partially reflective coating to a bottom surface of coupler duct 2310). Thus, the reflective surface advantageously does not need to be inside primary waveguide 2305. A coupling prism 2320 may be coupled to (e.g., adhered to) coupler duct 2310. A prism face absorber 2325 may be applied to a surface of coupling prism 2320 different from, but adjacent to, an input coupling face of coupling prism 2320.

In some examples, the partially reflective surface may enable primary waveguide 2305 and coupler duct 2310 to act as separate, but coupled waveguides. If the coupler duct 2310 is thinner than primary waveguide 2305 (e.g., $d_c < d_w$), then optical device 2300 may fully homogenize high mode angles utilizing a smaller coupling prism than would generally be required by the primary waveguide 2305 alone. Coupler duct 2310 may then be able to emit a larger coupled pupil 2330 into primary waveguide 2305. In this manner, coupler duct 2310 may perform intermediate pupil expansion. Light remaining in coupler duct 2310 at its end may be absorbed by end absorber 2315. In some examples, light intensity may be approximately equalized at an end of coupler duct 2310, and a fraction of light coupled into primary waveguide 2305 may be given by a ratio of the primary waveguide 2305 to a total thickness (e.g., thickness of both the primary waveguide 2305 and coupler duct 2310).

In some implementations, a 0.5 mm coupler duct coupling into a 1.5 mm primary waveguide might achieve a coupling efficiency of 75%. A homogenizing surface input coupler with duct thickness 0.5 mm and coupling prism of size 4 mm may thus in-couple a homogenized internal mode with angle $\theta_{max}=76°$, which would otherwise require a 12 mm prism to couple directly. Such an optical system may also be able to employ correspondingly smaller external projection optics.

Figure 24A:
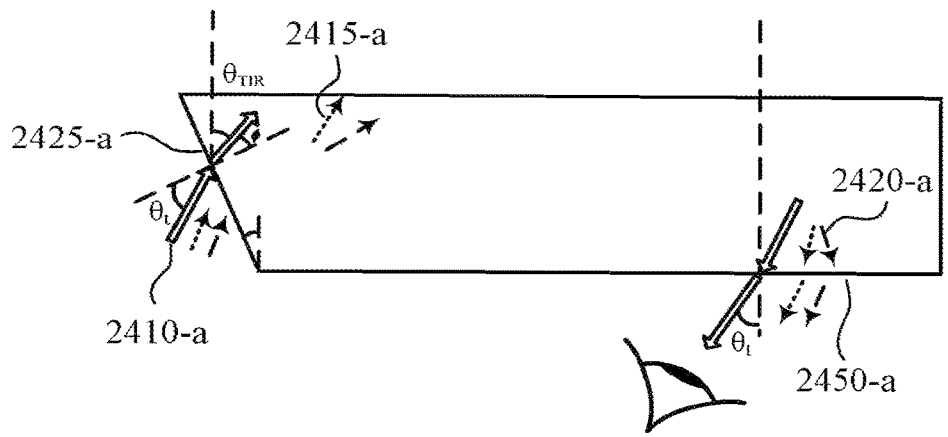
FIGS. 24A-24C illustrate examples of edge-coupled and surface-coupled input coupling dispersion compensating techniques in accordance with various aspects of the present disclosure.
Figure 24B:
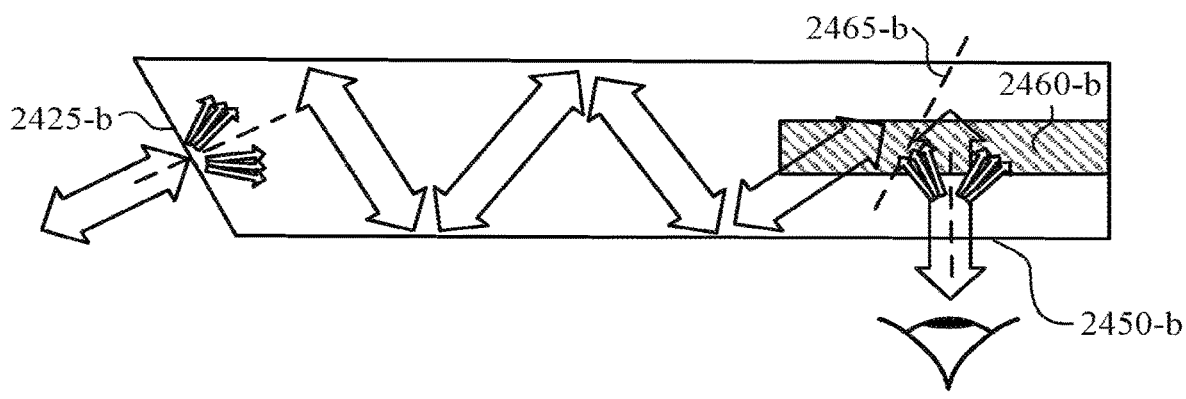
Figure 24C:
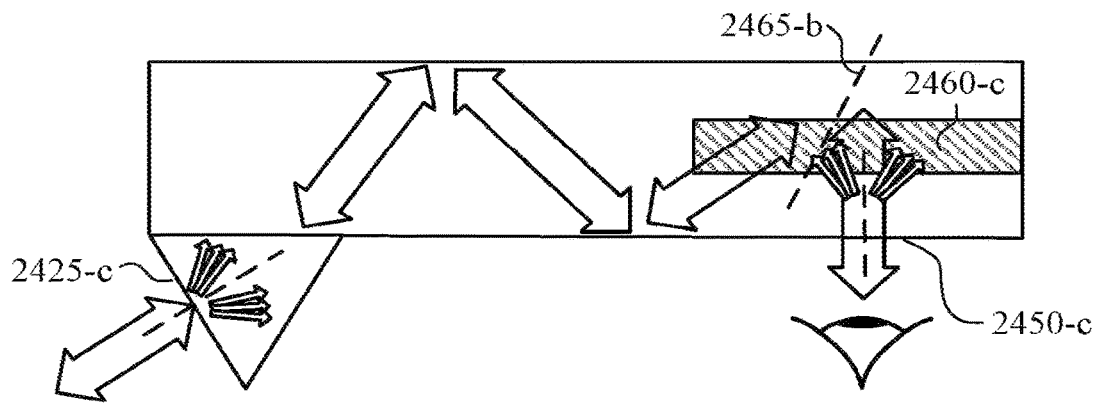

FIGS. 24A-24C illustrate examples of edge-coupled and surface-coupled input coupling dispersion compensating techniques in accordance with various aspects of the present disclosure. Input coupling techniques may be designed to compensate chromatic dispersion. In the example of FIG. 24A, waveguide 2400-a includes an edge facet for optical element intercoupling and may support symmetric facet dispersion compensation techniques.

In some cases, the features of waveguide 2400-a may support dispersion compensation without implementing a $\Delta n(\vec{K})$ k-space dispersion deviation. As illustrated, a reflected light beam (e.g., mode) may exit the waveguide 2400-a at exit face 2450-a at a desired external tilt angle $\theta_T$ with respect to surface normal of exit face 2450-a of waveguide 2400-a. External tilt angle $\theta_T$ corresponds to an internal tilt angle $\phi$, provided via Snell's law, of an incident mode reflected by the holographic optical element, and represented by external incident vector 2410-a.

The internal angle of the mode incident to the skew mirror, $\theta_{TIR}$, may be determined by an axis associated with the characterized properties of the holographic optical element and corresponding to an angular offset, with reference to surface normal (e.g., skew axis). If, in the case that the edge facet is angularly offset from surface normal by 90°−$\theta_{TIR}$-α as illustrated by input coupling face 2425-a, the external incidence angle of the mode with respect to the edge facet will also be $\theta_T$, so that any chromatic aberration introduced by the edge facet will be precisely reversed as the mode is reflected and subsequently exits waveguide 2400-a. Further, as illustrated, by granular modes 2415-a and 2420-a, shorter wavelengths may exhibit larger directional orientation changes (e.g., bending) at each refraction, promoting parallel departure modes from parallel incident modes.

Symmetric facet dispersion compensation may work for all field angles, both incident to and departing from the figure plane, due to sustained symmetry between the incident and exiting angles. Similarly symmetric facet dispersion compensation may prevent the introduction of field distortion due to sustained symmetry between the incident and exiting angles.

In the edge-coupled input coupling dispersion compensating example of FIG. 24B, input coupling face of non-diffractive edge portion 2425-b and exit face 2450-b may have differing dispersive properties and differing ray angles combined in a manner that controls chromatic dispersion. The dispersive properties and angle of an input and/or output surface may be selected to control dispersion due to another element, such as an external projector or a waveguide layer with different dispersive properties.

In some examples, a plurality of volume holograms in a grating medium 2460-b may be configured to reflect in-coupled light about a reflective axis 2465-b. Reflective axis 2465-b may be offset from a surface normal of exit face 2450-b of waveguide 2400-b for at least some internal incidence angles of the in-coupled light. An angle that reflective axis 2465-b is offset from the surface normal of exit face 2450-b may be approximately half the angular dimension of an angle that surface normal of the input coupling face of non-diffractive edge portion 2425-b is offset with respect to the surface normal of the exit face 2450-b. Thus, when reflective axis 2465-b is half of your input coupling face angle, dispersion may be avoided or significantly mitigated.

For example, if the reflective axis 2465-b is 28° with respect to the surface normal of the exit face 2450-b, then the angle of the input coupling face of non-diffractive edge portion 2425-b may be set to 56° with respect to the surface normal of the exit face 2450-b to counter chromatic dispersion effects. In this edge-coupled input coupling dispersion compensating example, non-diffractive edge portion 2425-c is index-matched with grating medium 2460-c. In the surface-coupled input coupling dispersion compensating example of FIG. 24C, input coupling face of non-diffractive prism 2425-c and exit face 2450-c may have differing dispersive properties and differing ray angles combined in a manner that controls chromatic dispersion. The dispersive properties and angle of an input and/or output surface may be selected to control dispersion due to another element, such as an external projector or a waveguide layer with different dispersive properties.

In some examples, a plurality of volume holograms in a grating medium 2460-c may be configured to reflect in-coupled light about a reflective axis 2465-c. Reflective axis 2465-c may be offset from surface normal of exit face 2450-c of waveguide 2400-c for at least some internal incidence angles of the in-coupled light. An angle that reflective axis 2465-*c* is offset from the surface normal of exit face 2450-*c* may be approximately half the angular dimension of an angle that surface normal of the input coupling face of non-diffractive prism 2425-*c* is offset with respect to the surface normal of the exit face 2450-*c*. In this surface-coupled input coupling dispersion compensating example, non-diffractive prism 2425-*c* is index-matched with grating medium 2460-*c*.

It should be noted that these methods and optical devices describe possible implementation, and that the operations and the steps or features may be rearranged or otherwise modified such that other implementations are possible. In some examples, aspects from two or more of the methods or optical devices may be combined. For example, aspects of each of the methods may include steps or aspects of the other methods, or other steps or techniques described herein.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein given the benefit of the present disclosure. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein throughout the entirety of the specification, should be understood to control over dictionary definitions, definitions in documents incorporated by reference, and/or ordinary meanings of the defined terms. The terms and phases described below are not to be accorded any special meaning by comparison with the other terms and phases described above and throughout the specification. Rather, the terms and phases described below are provided for additional clarity and as further examples of the subject technology in accordance with aspects of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 221.03.

The term "approximately," refers to plus or minus 10% of the value given.

The term "reflective axis" refers to an axis that bisects an angle of incident light relative to its reflection. The absolute value of an angle of incidence of the incident light relative to the reflective axis is equal to the absolute value of the angle of reflection of the incident light's reflection, relative to the reflective axis. For conventional mirrors, the reflective axis is coincident with surface normal (i.e., the reflective axis is perpendicular to the mirror surface). Conversely, implementations of skew mirrors according to the present disclosure may have a reflective axis that differs from surface normal, or in some cases may have a reflective axis that is coincident with surface normal. Persons skilled in the art given the benefit of the present disclosure will recognize that a reflective axis angle can be determined by adding an angle of incidence to its respective angle of reflection, and dividing the resulting sum by two. Angles of incidence and angles of reflection can be determined empirically, with multiple measurements (generally three or more) used to generate a mean value.

The term "reflection" and similar terms are used in this disclosure in some cases where "diffraction" might ordinarily be considered an appropriate term. This use of "reflection" is consistent with mirror-like properties exhibited by skew mirrors and helps avoid potentially confusing terminology. For example, where a grating structure is said to be configured to "reflect" incident light, a conventional artisan might prefer to say the grating structure is configured to "diffract" incident light, since grating structures are generally thought to act on light by diffraction. However, such use of the term "diffract" would result in expressions such as "incident light is diffracted about substantially constant reflective axes," which could be confusing. Accordingly, where incident light is said to be "reflected" by a grating structure, persons of ordinary skill in art, given the benefit of this disclosure, will recognize that the grating structure is in fact "reflecting" the light by a diffractive mechanism. Such use of "reflect" is not without precedent in optics, as conventional mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

The term "light" refers to electromagnetic radiation familiar to persons skilled in the art. Unless reference is made to a specific wavelength or range of wavelengths, such as "visible light", which refers to a part of the electromagnetic spectrum visible to the human eye, the electromagnetic radiation can have any wavelength.

The terms "hologram" and "holographic grating" refer to a recording of an interference pattern generated by interference between multiple intersecting light beams. In some examples, a hologram or holographic grating may be generated by interference between multiple intersecting light beams where each of the multiple intersecting light beams remains invariant for an exposure time. In other examples, a hologram or holographic grating may be generated by interference between multiple intersecting light beams where an angle of incidence of at least one of the multiple intersecting light beams upon the grating medium is varied while the hologram is being recorded, and/or where wavelengths are varied while the hologram is being recorded (e.g., a complex hologram or complex holographic grating).

The term "sinusoidal volume grating" refers to an optical component which has an optical property, such as refractive index, modulated with a substantially sinusoidal profile throughout a volumetric region. Each (simple/sinusoidal) grating corresponds to a single complementary vector pair in k-space (or a substantially point-like complementary pair distribution in k-space).

The term "entrance pupil" refers to a real or virtual aperture passing a beam of light, at its minimum size, entering into imaging optics.

The term "eye box" refers to a two-dimensional area outlining a region wherein a human pupil may be placed for viewing the full field of view at a fixed distance from a grating structure.

The term "eye relief" refers to a fixed distance between a grating structure and a corresponding eye box.

The term "exit pupil" refers to a real or virtual aperture passing a beam of light, at its minimum size, emerging from imaging optics. In use, the imaging optics system is typically configured to direct the beam of light toward image capture means. Examples of image capture means include, but are not limited to, a user's eye, a camera, or other photodetector.

The term "grating medium" refers to a physical medium that is configured with a grating structure for reflecting light. A grating medium may include multiple grating structures.

The term "grating structure" refers to one or more gratings configured to reflect light. In some examples, a grating structure may include a set of gratings that share at least one common attribute or characteristic (e.g., a same wavelength of light to which each of the set of gratings is responsive). In some implementations, a grating structure may include one or more holograms. In other implementations, a grating structure may include one or more sinusoidal volume gratings. In some examples, the grating structures may be uniform with respect to a reflective axis for each of the one or more gratings (e.g., holograms or sinusoidal gratings). Alternatively or additionally, the grating structures may be uniform with respect to a length or volume for each of the one or more gratings (e.g., holograms or sinusoidal volume gratings) within the grating medium.

The term "polarization" refers to a property applying to transverse waves that specifies the geometrical orientation of the oscillations. Light in the form of a plane wave in space may be classified as linearly polarized. Implicit in the parameterization of polarized light is the orientation of the reference coordinate frame. A common coordinate system relates to a plane of incidence of the light associated with the incoming propagation direction of the light and the vector perpendicular to the plane of interface. A 'p' polarization state may refer to linearly polarized light whose electric field is along (e.g., parallel) to the plane of incidence. A 's' polarization state may refer to linearly polarized light whose electric field is normal to the plane of incidence. 'P' polarized light may also be referred to as transverse-magnetic (TM), pi-polarized, or tangential plane polarized light. 'S' polarized light may also be referred to as transverse-electric (TE), sigma-polarized, or sagittal plane polarized light.

The term "azimuth angle" refers to an angle between a perpendicularly projected vector onto a reference plane and a reference vector of the reference plane. A reflective coating of a substrate element may exhibit azimuthal selectivity, meaning a variance in reflectivity associated with an azimuth angle of an incident light beam (e.g., mode) at the reflective coating. In some cases, all parallel modes at a reference azimuth angle desired for a light coupling device may be highly transmissive through the reflective coating. Alternatively, the more the azimuth angle of an incident mode deviates from the reference azimuth angle of the coating, the greater the reflectivity at the coating element. As a result, two modes with the same angle of incidence but differing azimuth angles with reference to the substrate may experience different levels of reflectivity. Such a property at the reflective coating elements of a light coupling device may prevent light from escaping in a suboptimal direction of the substrate.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

In the appended figures, similar components or features may have the same reference label. Further, various components of the same type may be distinguished by following the reference label by a dash and a second label that distinguishes among the similar components. If just the first reference label is used in the specification, the description may be applicable to any one of the similar components having the same first reference label irrespective of the second reference label.

What is claimed is:

1. An optical waveguide comprising:
   a first layer;
   a second layer on the first layer; and
   a third layer on the second layer, wherein:
      the first layer has a first surface at the second layer and a second surface opposite the first surface,
      the first layer has an edge that extends at a non-perpendicular angle from the first surface to the second surface, and
      the first layer is configured to couple light into the optical waveguide through the edge.

2. The optical waveguide of claim 1, further comprising an output coupler in the second layer and configured to couple the light out of the optical waveguide.

3. The optical waveguide of claim 2, wherein the output coupler comprises a volume hologram.

4. The optical waveguide of claim 2, wherein the output coupler comprises a louvered mirror.

5. The optical waveguide of claim 1, wherein the second layer has an edge that extends from the first layer to the third layer at a non-parallel angle with respect to the edge of the first layer.

6. The optical waveguide of claim 5, wherein the third layer has an edge that extends parallel to the edge of the second layer.

7. The optical waveguide of claim 6, wherein the edge of the second layer is aligned with the edge of the third layer.

8. The optical waveguide of claim 7, wherein the edge of the second layer and the edge of the third layer extend perpendicular with respect to the first and second surfaces of the first layer.

9. The optical waveguide of claim 1, wherein the second layer is interposed between the first and third layers.

10. An electronic device comprising:
    a waveguide having a first layer, a second layer, and a third layer between the first and second layers;
    a fourth layer having a first surface mounted to the first layer and a second surface opposite the first surface, wherein the first layer is between the third layer and the fourth layer; and
    a prism mounted to the second surface, the prism being configured to couple light into the waveguide through the fourth layer.

11. The electronic device of claim 10, wherein the waveguide and at least part of the fourth layer are configured to propagate the light via total internal reflection.

12. The electronic device of claim 10, further comprising:
    a partially reflective coating between the first layer and the first surface of the fourth layer.

13. The electronic device of claim 10, wherein the fourth layer has an edge extending from the first surface to the second surface, the electronic device further comprising:
    an absorber at an end of the fourth layer.

14. The electronic device of claim 10, wherein the fourth layer is thinner than the waveguide.

15. The electronic device of claim 10, wherein the fourth layer has an edge extending from the first surface to the second surface, the prism has an input face that extends at a non-perpendicular angle with respect to the edge of the fourth layer, and the prism has an additional face that extends from the input face to the second surface of the fourth layer.

16. The electronic device of claim 15, further comprising an absorber on the additional face of the prism.

17. The electronic device of claim 10, wherein the first surface of the fourth layer is adhered to the first layer and wherein the prism is adhered to the second surface of the fourth layer.

18. The electronic device of claim 10, further comprising a plurality of volume holograms in the third layer and configured to couple the light out of the waveguide.

19. The electronic device of claim 10, further comprising a louvered mirror in the third layer and configured to couple the light out of the waveguide.

20. An electronic device comprising:
    a waveguide, wherein the waveguide comprises:
       a first layer having opposing first and second surfaces,
       a second layer on the first surface,
       a third layer having a third surface on the second layer and a fourth surface opposite the third surface, wherein the second layer is between the first and third layers and the waveguide has an edge that extends from the second surface to the fourth surface at a non-perpendicular angle with respect to the first, second, third, and fourth surfaces, and
    a prism mounted to the second surface.

* * * * *

UNITED STATES PATENT AND TRADEMARK OFFICE
CERTIFICATE OF CORRECTION

| | |
|---|---|
| PATENT NO. | : 11,899,234 B2 |
| APPLICATION NO. | : 16/688878 |
| DATED | : February 13, 2024 |
| INVENTOR(S) | : Adam Urness et al. |

It is certified that error appears in the above-identified patent and that said Letters Patent is hereby corrected as shown below:

On the Title Page

Item (12), "Umess et al." should read -- Urness et al. --

Item (72), the inventor's name "Adam Umess" should read -- Adam Urness --

Signed and Sealed this
Seventeenth Day of September, 2024

Katherine Kelly Vidal
*Director of the United States Patent and Trademark Office*